(12) United States Patent
Ueda

(10) Patent No.: US 7,137,939 B2
(45) Date of Patent: Nov. 21, 2006

(54) MACHINE TOOL AND BORING BAR MAGAZINE

(75) Inventor: Toshio Ueda, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 5 days.

(21) Appl. No.: 11/006,716

(22) Filed: Dec. 8, 2004

(65) Prior Publication Data

US 2005/0137069 A1    Jun. 23, 2005

(30) Foreign Application Priority Data

Dec. 18, 2003  (JP)  .............................. 2003-421685

(51) Int. Cl.
*B23Q 3/157*    (2006.01)
(52) U.S. Cl. ........................................ 483/27; 29/27 C
(58) Field of Classification Search .................. 483/17, 483/18, 22, 23, 24, 25, 26, 27, 39, 40; 29/27 C, 29/27 R; 82/125, 126, 127, 137, 158
See application file for complete search history.

(56) References Cited

U.S. PATENT DOCUMENTS

| 3,323,393 | A | * | 6/1967 | Soykan ........................ 82/137 |
| 3,662,442 | A | * | 5/1972 | Noa ............................. 483/27 |
| 4,571,796 | A | * | 2/1986 | Sellner et al. .............. 29/27 R |
| 4,632,615 | A | * | 12/1986 | Yamamura ................... 409/235 |
| 4,955,264 | A | * | 9/1990 | Armbrust ..................... 82/158 |
| 5,289,622 | A | * | 3/1994 | Minagawa ................... 29/27 R |
| 5,964,016 | A | * | 10/1999 | Ito et al. ..................... 29/27 C |
| 6,185,818 | B1 | * | 2/2001 | Ito et al. ..................... 29/889.7 |
| 6,758,117 | B1 | * | 7/2004 | Baumann et al. .............. 29/36 |
| 2004/0161312 | A1 | * | 8/2004 | Hole et al. ................... 407/101 |

FOREIGN PATENT DOCUMENTS

| EP | 899057 | A1 | * | 3/1999 |
| EP | 900627 | A2 | * | 3/1999 |
| JP | 64-2839 | | | 1/1989 |
| JP | 11254206 | A | * | 9/1999 |
| JP | 2003-80408 | | | 3/2003 |

* cited by examiner

*Primary Examiner*—Monica Carter
*Assistant Examiner*—Dana Ross
(74) *Attorney, Agent, or Firm*—Armstrong, Kratz, Quintos, Hanson & Brooks, LLP

(57) ABSTRACT

A machine tool is provided with a base, a tool rest and a boring bar magazine. The tool rest is mounted on the base and retains a boring bar. The tool rest is moved in a first direction in parallel with an axis of the main spindle and in a second direction perpendicular to the first direction. The magazine is located opposite to a headstock and stocks the boring bars and swivels and indexes the boring bar. The tool rest is moved whereby the boring bars are changed by other ones between the tool rest and the magazine. Thus, the tool rest is moved in at least two directions so that the boring bars are changed between the tool rest and the magazine.

9 Claims, 22 Drawing Sheets

MACHINE TOOL AND BORING BAR MAGAZINE

BACKGROUND OF THE INVENTION

1. Field of the Invention

The present invention relates to a machine tool, having a boring bar magazine which may incorporate boring bars, which may perform turning with the boring bar.

2. Description of the Related Art

Boring bars are categorized in terms of types into regular boring bar, of which a length is 4 to 5 times longer than a diameter, and long boring bar having a length longer than the length of the regular boring bar. A technology relating to a machine tool in which a boring bar is mounted on a tool rest to turn a workpiece is disclosed in Japanese Patent Application Laid-Open No. 2003-80408 and Japanese Patent Application Laid-Open No. 64-2839.

The machine tool disclosed in the Japanese Patent Application Laid-Open No. 2003-80408 is structured that the tool rest may be moved in any directions of axes X, Y and Z. Also, in this machine tool, two devices for transferring the boring bar, in which boring bars are laid on their tables respectively, are juxtaposed in the Y-axis direction.

However, the devices for transferring the boring bar are not moved in the Y-axis direction. For this reason, the tool rest has to be moved also in the Y-axis direction in addition to the X-axis and Z-axis directions. As a result, there is a problem that the machine tool as a whole is complicated because of the necessity of means for moving the tool rest in the Y-axis direction.

Also, because the devices for transferring the boring bar are juxtaposed in the Y-axis direction, there is also a problem that it is impossible to increase the number of the boring bars which may be incorporated therein.

Japanese Patent Application Laid-Open No. 64-2839 discloses a lathe having a tool stocking device (boring bar magazine) which may stock a plurality of tools (boring bars). This tool stocking device is adapted to stock the plurality of tools and to make a swivel motion and is mounted on a headstock.

However, a heat generating source such as a motor is located in the headstock. For this reason, there is a fear that the heat generated in the headstock would propagate to the tool stocking device so that the tools stocked in the tool stocking device might be thermally deformed. On the other hand, when the tool stocking device is operated during machining with the lathe, there is also a fear that a vibration of the tool stocking device would propagate to the headstock so that an adverse affect such as degradation in machining accuracy would occur.

Further, because the tool stocking device is located on the headstock, a motor, a pulley, a partitioning plate and the like of the headstock would obstruct. As a result, an operator could not perform the operating work or the maintenance work by extending his or her hands from a front side of the lathe. The load imposed to the operator is high.

In another known machine tool, a clamping and unclamping mechanism is used for clamping a tool holder of a boring bar to the tool rest. In this conventional clamping and unclamping mechanism, a clamping part having a predetermined shape such as a T-shape is interposed, and the clamping part is drawn by a piston or the like. Thus, the tool holder is indirectly drawn and clamped through the clamping part.

However, according to this prior art, because the clamping part is needed, a dimension from a center of the tool rest to a centerline of the tool holder is elongated. As a result, when a workpiece is turned by the boring bar, a moment due to a force applied to a machining position is increased. Accordingly, there is a problem that a large stress is applied to the position adjacent to the clamping and unclamping mechanism. Also, there is a tendency that the rigidity of the tool rest and the tool holder as a whole would be reduced.

SUMMARY OF THE INVENTION

Accordingly, in order to overcome the above-noted defects, an object of the present invention is to provide a machine tool, having a boring bar magazine, in which only if a tool rest is movable at least in two directions, it is possible to change boring bars between a tool rest and the boring bar magazine, also it is possible to interrupt an adverse affect such as heat and vibration between the boring bar magazine and the headstock, and it is easy to perform the operation to the boring bar magazine and a maintenance work, and to provide the boring bar magazine to be used in the machine tool.

In order to attain the above-noted or other objects, according to the present invention, there is provided a machine tool having a boring bar magazine, comprising: a base of the machine tool; a main spindle having an axis directed substantially in a horizontal direction to a floor surface and, the main spindle being provided with a chuck at a tip end; a headstock, positioned on one side out of right and left directions of the machine tool and provided on the base, for rotatably supporting the main spindle; a tool rest, provided on the base, being capable of supporting at least the boring bar and being movable in at least two directions of a first direction in parallel to the axis of the main spindle and a second direction perpendicular to the first direction; and a boring bar magazine, positioned on the other side out of the right and left directions of the machine tool and provided on the base, which stocks a single or a plurality of boring bars and performs a swiveling and indexing operations, wherein the boring bar of the tool rest is moved in the at least two directions relative to the workpiece gripped by the chuck to thereby turn the workpiece, and the tool rest is moved to change the boring bars between the tool rest and the magazine at an index position.

Preferably, a tool holder of the boring bar is mounted on a boring bar mounting portion provided on the tool rest and is clamped and unclamped by a clamping and unclamping mechanism, and the clamping and unclamping mechanism comprises: holder side tapered surfaces and holder side plain end faces continuous with the holder side tapered surfaces which are formed on the tool holder and extend, respectively, in a direction in parallel with a centerline of the tool holder; tool rest side tapered surfaces and tool rest side plain end faces continuous with the tool rest side tapered surfaces which are formed on the boring bar mounting portion of the tool rest and extend, respectively, in a direction in parallel with a centerline of the tool rest; and cylinder portions which are provided in the boring bar mounting portion and are controlled, wherein the tool holder is directly depressed by pistons of the cylinder portions whereby the holder side plain end faces and the holder side tapered surfaces are depressed against the tool rest side plain end faces and the tool rest side tapered surfaces, respectively, to thereby clamp the tool holder to the tool rest.

Preferably, the tool rest is controlled so that the centerline of the tool rest is directed in a direction in parallel with a centerline of a magazine body portion when the boring bars are changed with each other between the tool rest and the magazine, and at this time, the centerline of the magazine body portion, the index position, the boring bar mounting portion, and the centerline of the tool rest are located on the same axis line.

Preferably, a boring bar engagement hole into which a boring bar tool is inserted and engaged from one side of the boring bar engagement hole by any desired first insertion depth dimension is formed through the tool holder in a longitudinal direction, the boring bar tool inserted into the boring bar engagement hole is positioned and fixed by fastening members provided on the tool holder, a lid member for having, in its interior, a cutting fluid feed pathway and for covering the boring bar engagement hole is mounted on the other side of the tool holder, a projecting member in which a nozzle engagement hole is formed in communication with the cutting fluid feed pathway is mounted on the lid member, and a nozzle inserted into and engaged with the nozzle engagement hole by any desired second insertion depth dimension is mounted on an end portion the boring bar tool, whereby cutting fluid runs from the cutting fluid feed pathway of the lid member through the nozzle engagement hole of the projecting member, the nozzle and an inside flow path of the boring bar tool in this order and injects from the boring bar.

Preferably, the boring bar is adapted to change at least one dimension out of the first insertion depth dimension of the boring bar tool inserted into the boring bar engagement hole, the second insertion depth dimension of the nozzle inserted into the nozzle engagement hole and the length dimension of the projecting member, respectively, whereby it is possible to adjust the length dimension of the boring bar tool extending outwardly from the tool holder while keeping the flow path through which the cutting fluid runs.

Preferably, the magazine is adapted to move in the first direction between a boring bar changing position and a retracted position.

Preferably, the machine tool is a multi-axis turning center, a rotating tool other than the boring bar is mounted onto the tool rest, and the tool rest is movable also in a third direction which is perpendicular to the first direction and the second direction, respectively, and swivels about an axis of the third direction.

According to the present invention, there is provided the boring bar magazine which is used in the machine tool.

Preferably, the magazine is arranged in a position largely remote from the headstock.

Preferably, the magazine body portion has three receiving portions and one plain surface portion to form a substantially rectangular shape as viewed from side, the boring bars are received in the three receiving portions, respectively, and a cover member receiving portion for receiving a tool rest cover member is fixed to the plain surface portion.

In the machine tool and the boring bar magazine according to the present invention, with the structure as described above, only if a tool rest is movable in at least two directions, it is possible to change boring bars between the tool rest and the boring bar magazine. Also, it is possible to interrupt an adverse affect such as heat and vibration between the boring bar magazine and the headstock, and it is easy to perform the operation to the boring bar magazine and the maintenance work.

BRIEF DESCRIPTION OF THE DRAWINGS

FIG. 2 is a frontal view of the machine tool.

FIG. 3 is a right side elevational cross-sectional view of the machine tool.

FIG. 4 is a partially enlarged cross-sectional view of FIG. 3.

FIG. 5 is a left side view of a boring bar magazine.

FIG. 6 is a perspective view of the boring bar magazine.

FIG. 7 is a partially enlarged perspective view of FIG. 6.

FIG. 8 is a partially enlarged perspective view of FIG. 7.

FIG. 9 is a partially enlarged perspective view of the boring bar magazine as viewed from below.

FIG. 10 is a cross-sectional view of the boring bar magazine.

FIG. 11 is a perspective view of a tool rest.

FIG. 12 is a perspective view of the tool rest.

FIG. 13 is a partially enlarged perspective view of FIG. 11.

FIG. 14 is a partially enlarged perspective view of FIG. 12.

FIG. 15 is a partially enlarged perspective view of the condition that a boring bar has been removed.

FIG. 16 is a partially enlarged perspective view of the condition that the boring bar has been removed.

FIG. 17 is a cross-sectional view of a clamping and unclamping mechanism and shows an unclamped condition.

FIG. 18 is a cross-sectional view of the clamping and unclamping mechanism and shows a clamped condition.

FIG. 19 is a cross-sectional view of the boring bar.

FIG. 20 is a cross-sectional view of the boring bar.

FIG. 21 is a cross-sectional view of the boring bar which is different by 90 degrees from FIG. 20.

FIG. 22 is a cross-sectional view of the boring bar.

DESCRIPTION OF THE EXEMPLARY EMBODIMENTS

Embodiments of the present invention will now be described with reference to FIG. 1 to FIG. 22.

Figure 1:
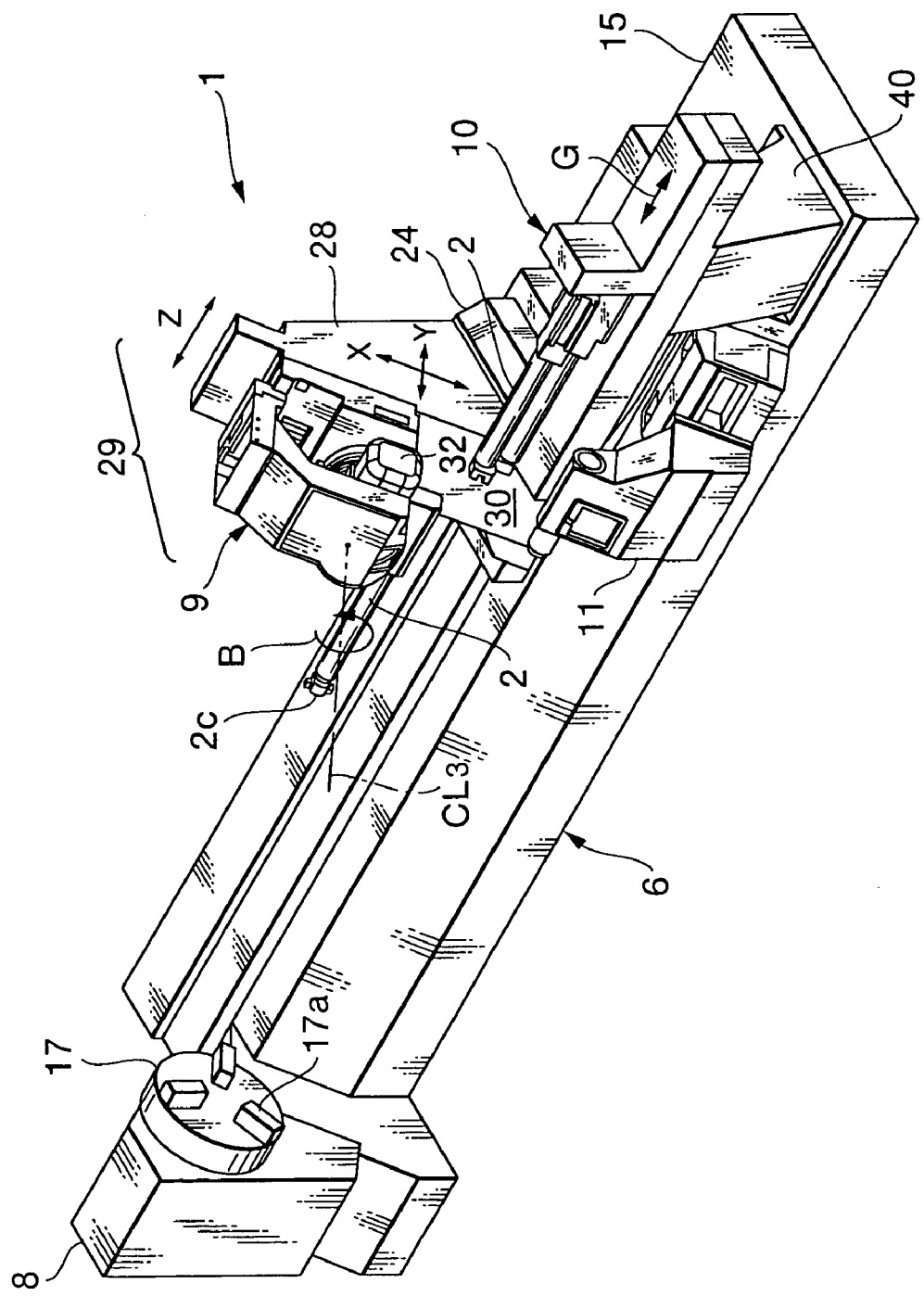
FIG. 1 to FIG. 22 are views showing embodiments of the present invention and FIG. 1 is a schematic perspective view of a machine tool.
Figure 2:
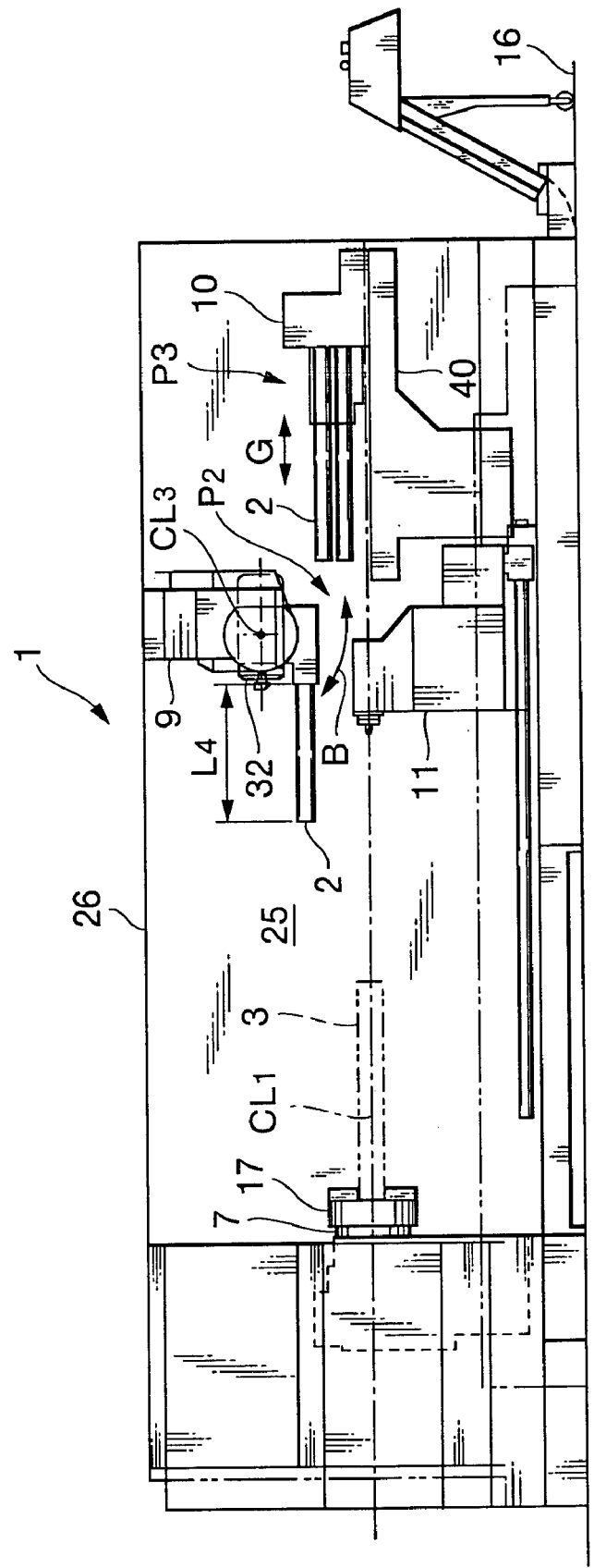
Figure 3:
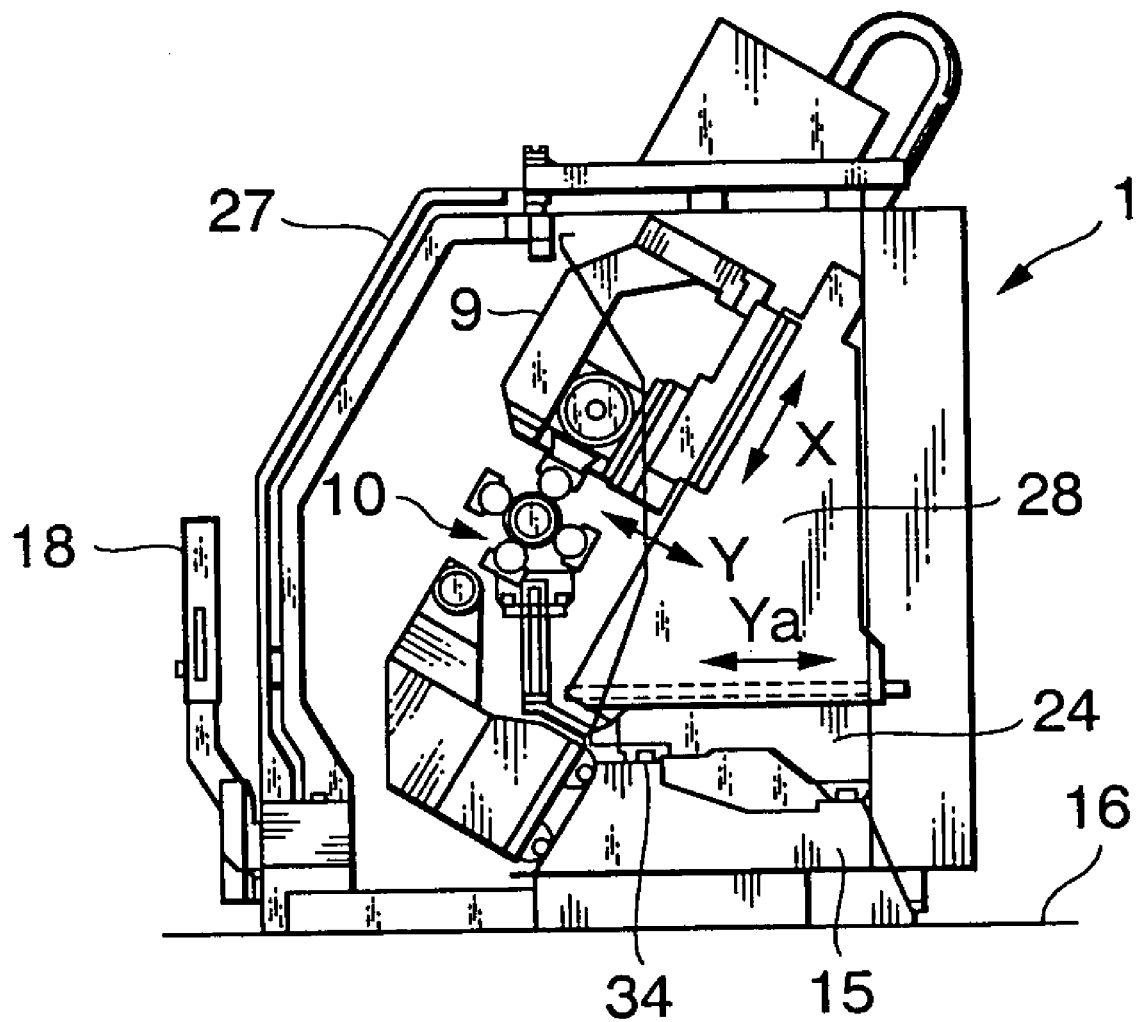
Figure 4:
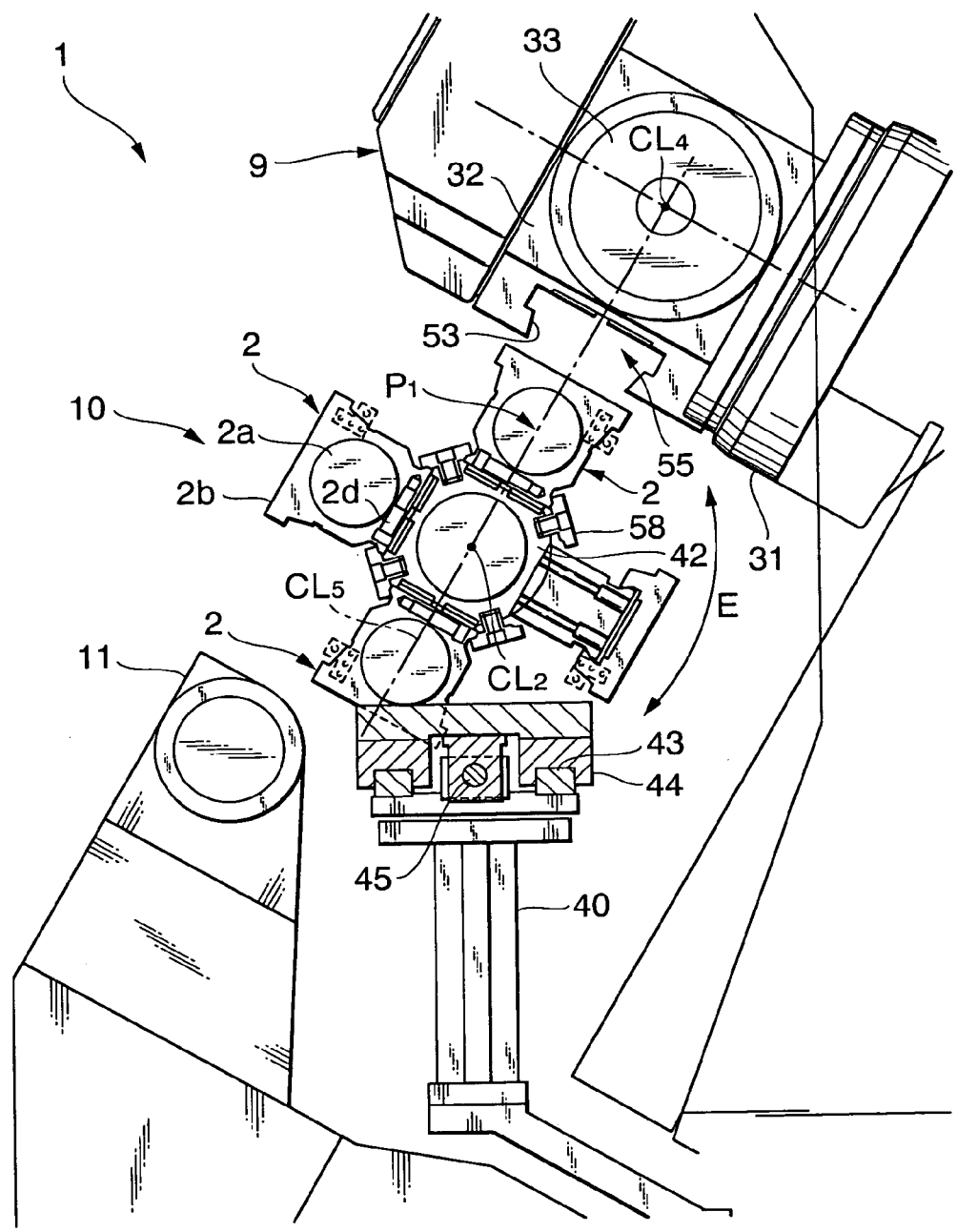
Figure 5:
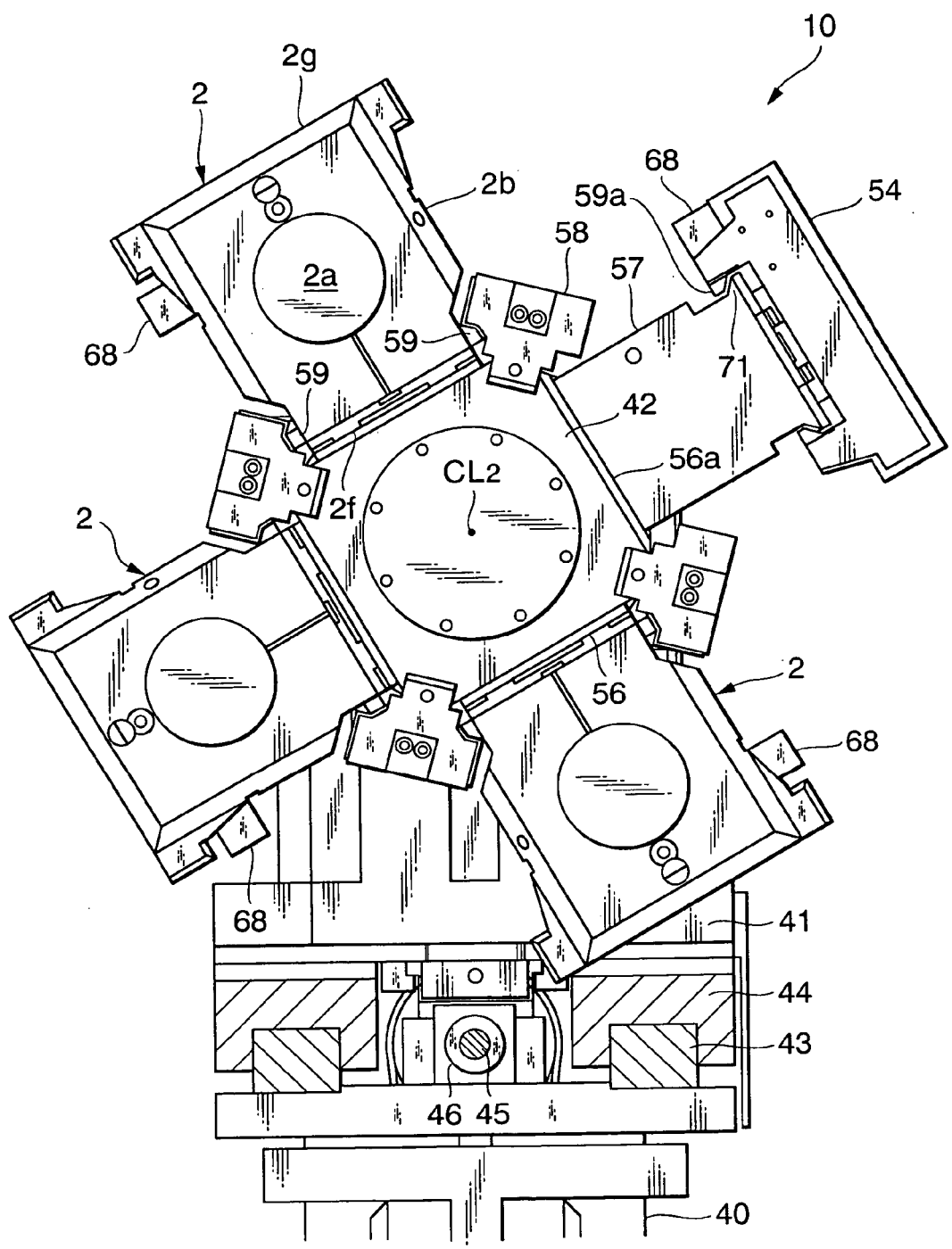
Figure 6:
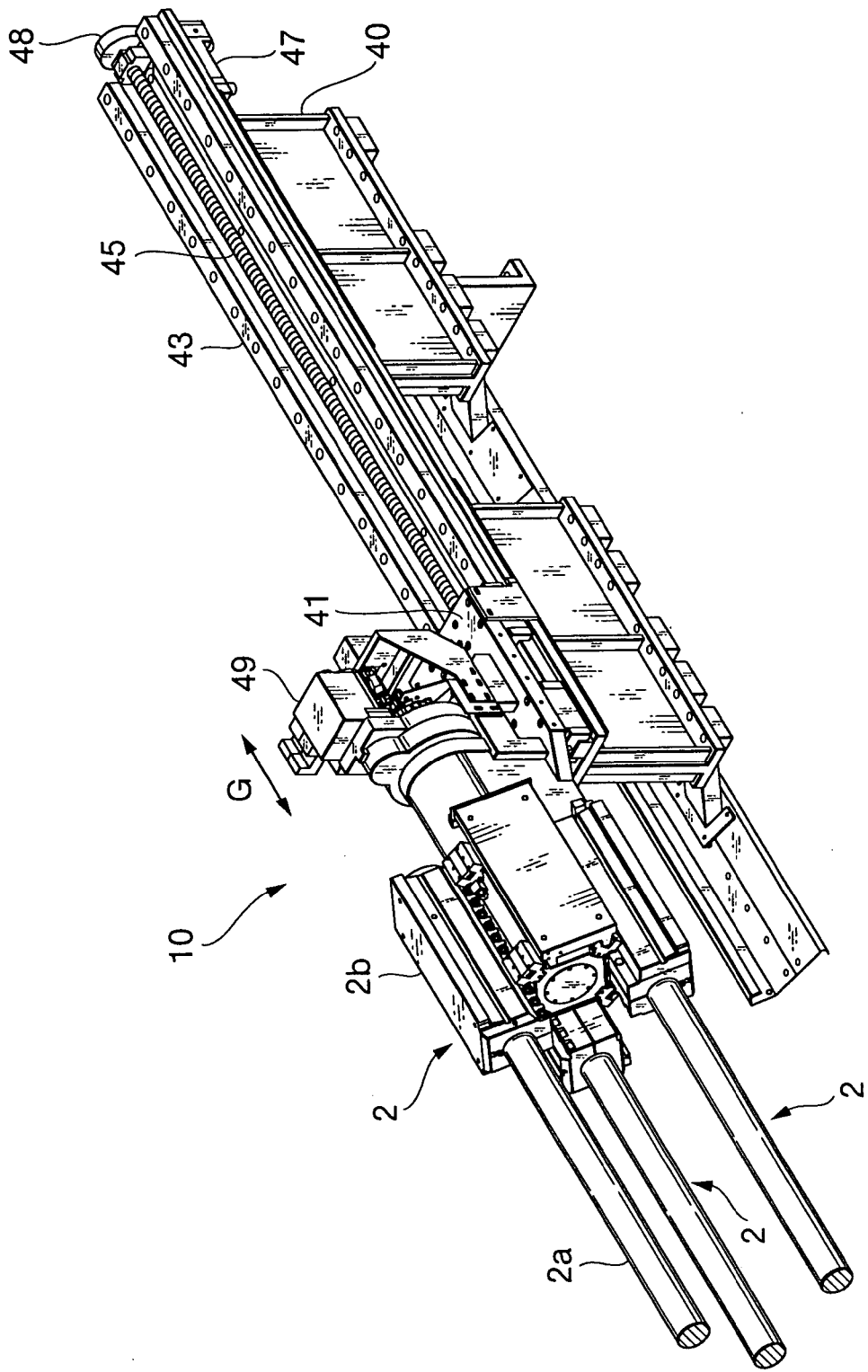
Figure 7:
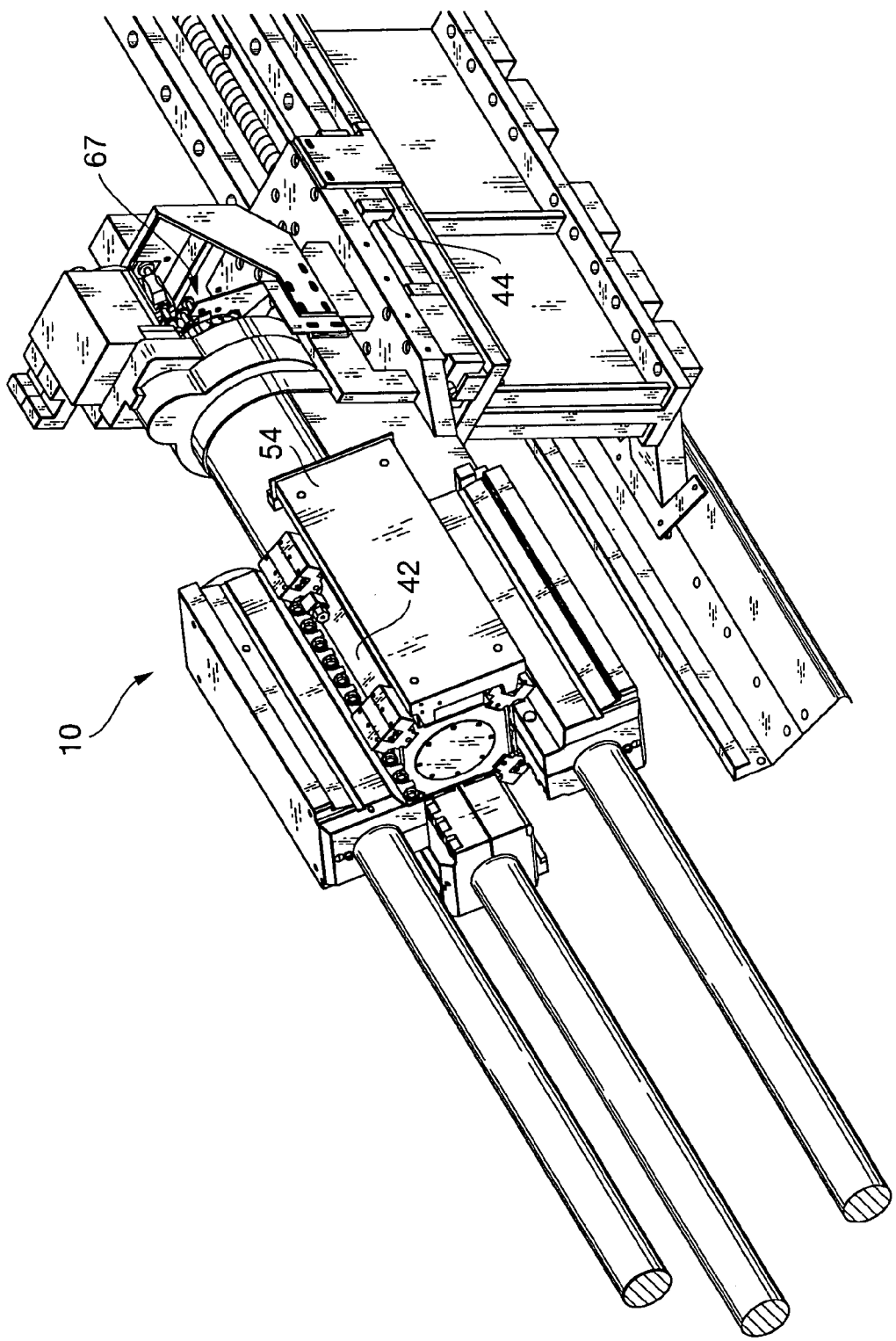
Figure 8:
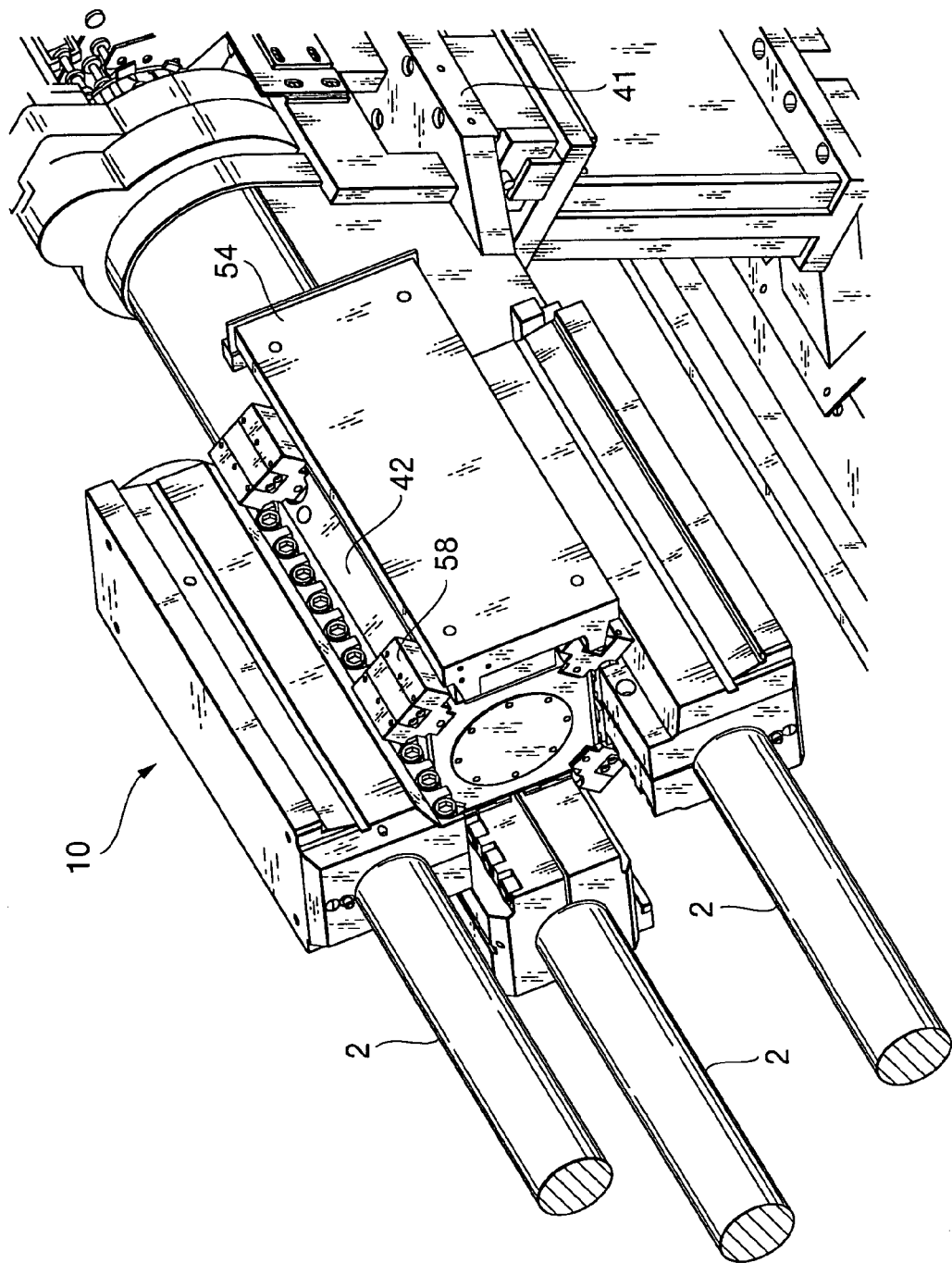
Figure 9:
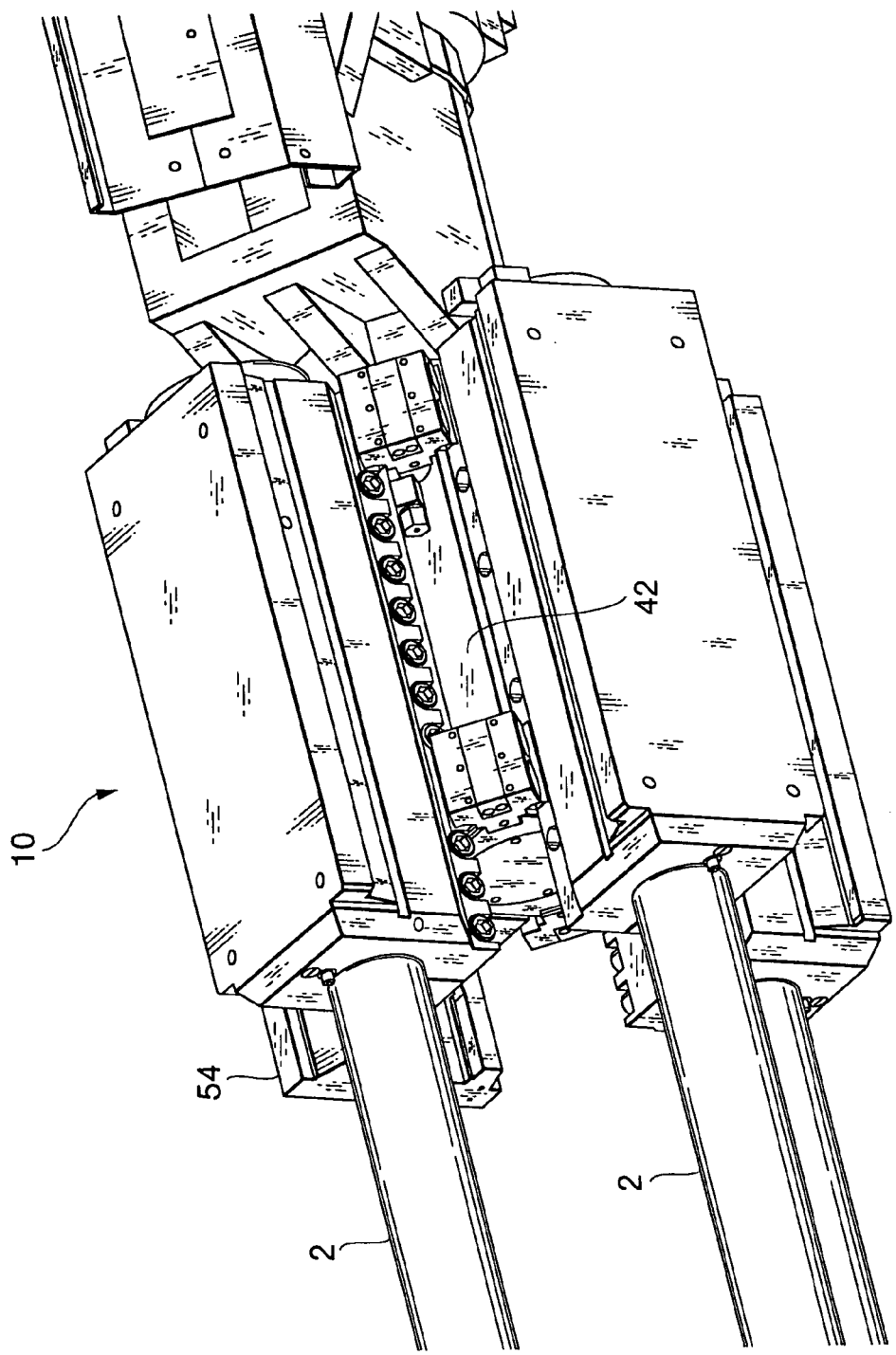
Figure 10:
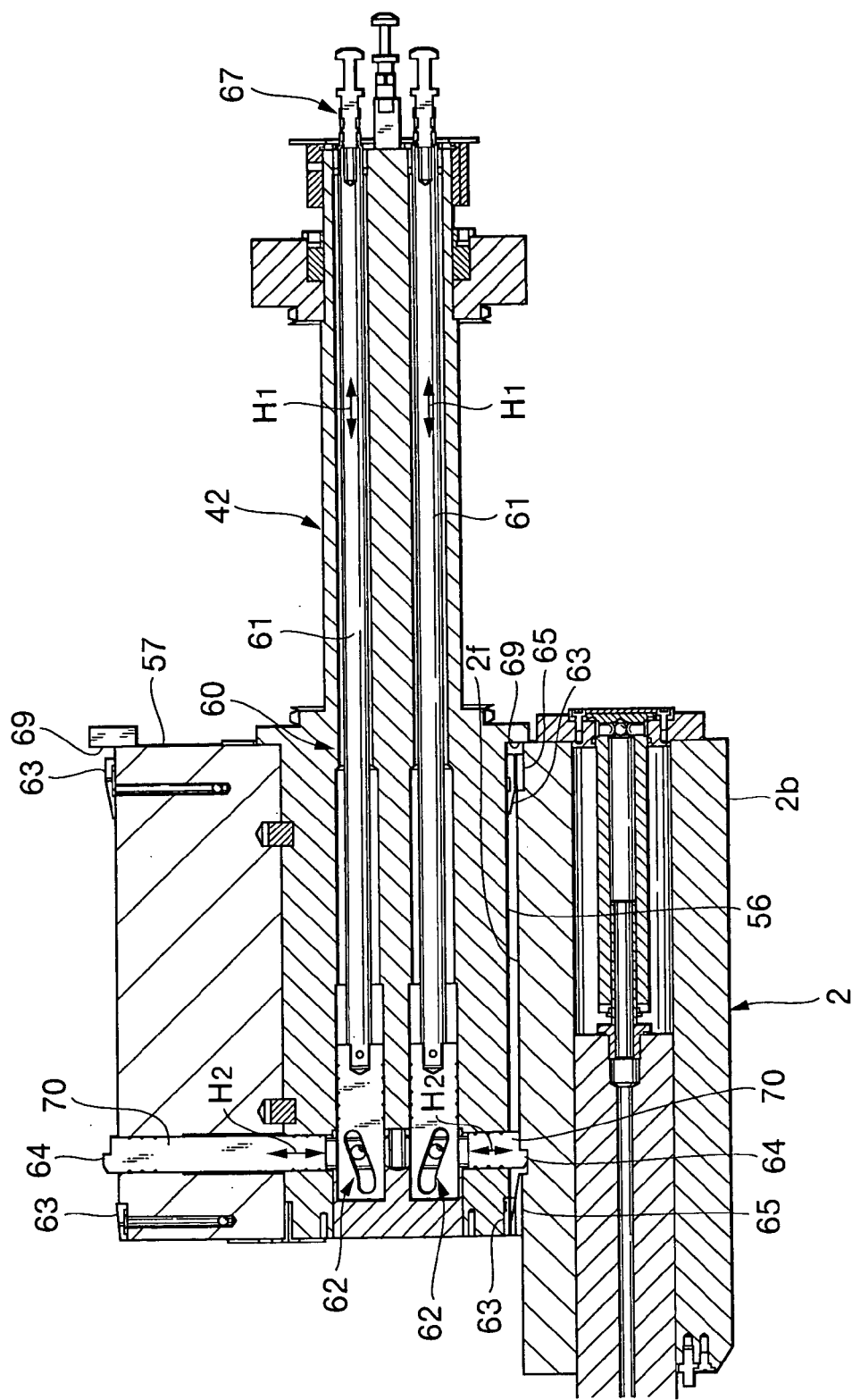

FIG. 1 to FIG. 22 are views showing the embodiments of the present invention. FIG. 1, FIG. 2 and FIG. 3 are a schematic perspective view, a frontal view and a right side cross-sectional view of a machine tool, respectively. FIG. 4 is a partially enlarged cross-sectional view of FIG. 3. FIG. 5 and FIG. 6 are a left side view and a perspective view of a boring bar magazine, respectively. FIG. 7 is a partially enlarged perspective view of FIG. 6. FIG. 8 is a partially enlarged perspective view of FIG. 7. FIG. 9 is a partially enlarged perspective view of the boring bar magazine as viewed from below. FIG. 10 is a cross-sectional view of the boring bar magazine.

Figure 11:
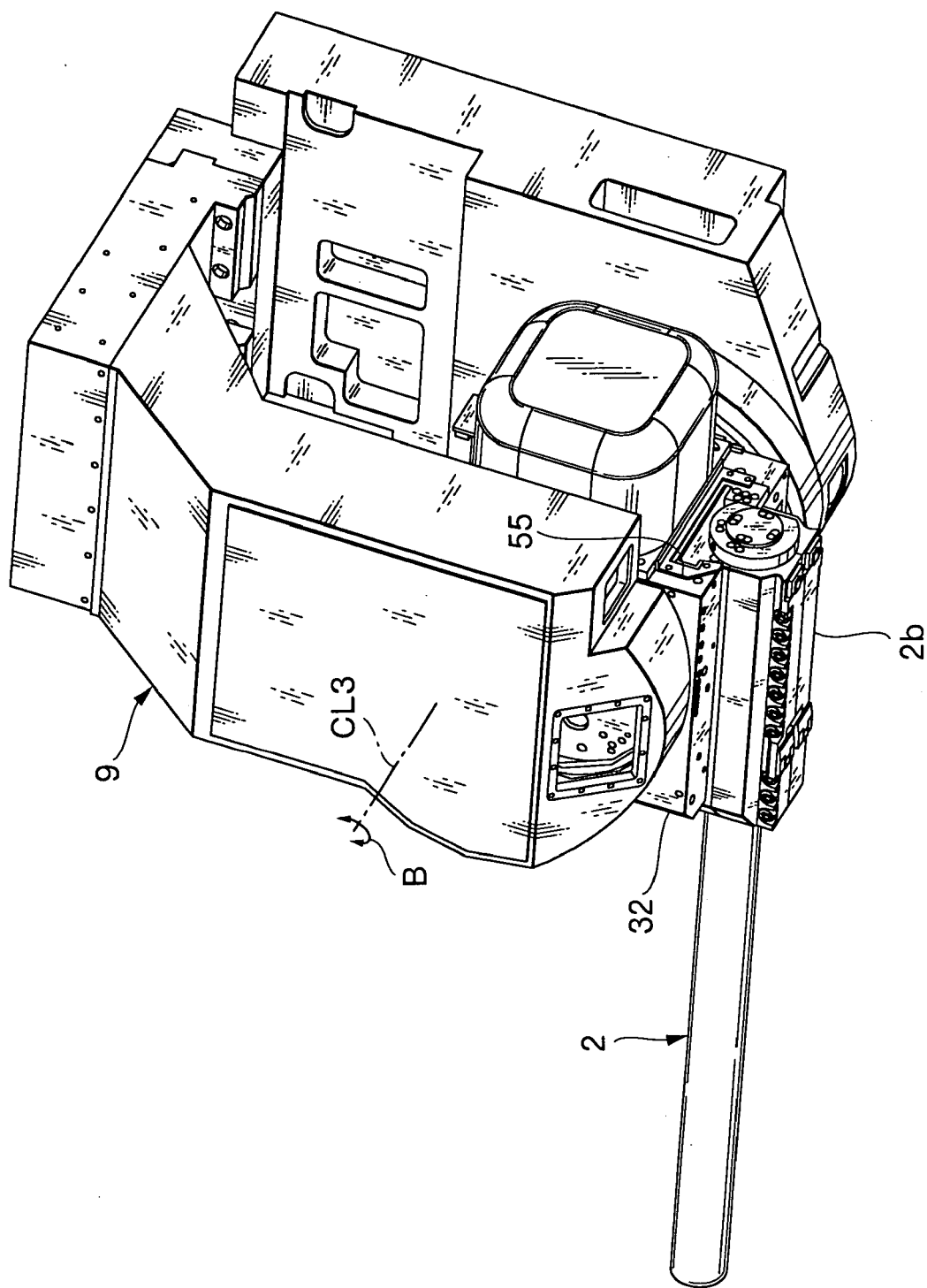
Figure 12:
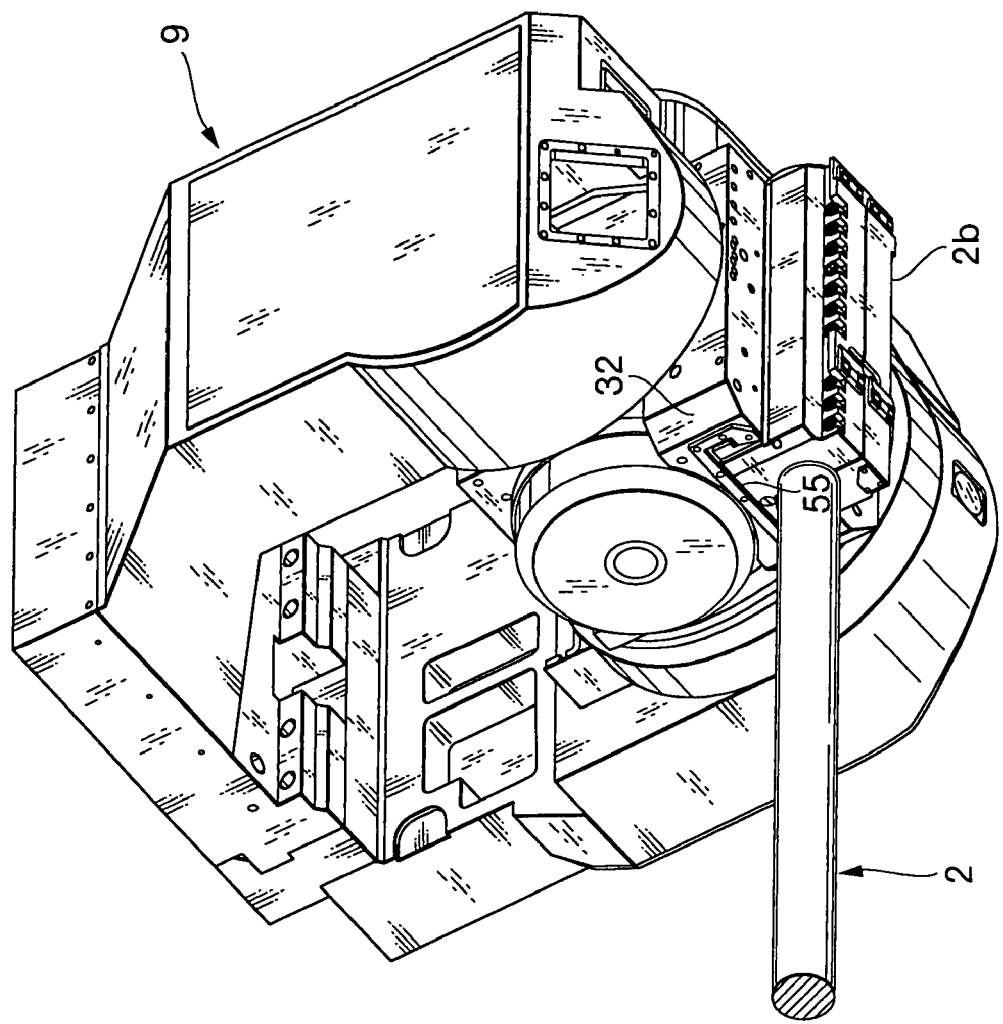
Figure 13:
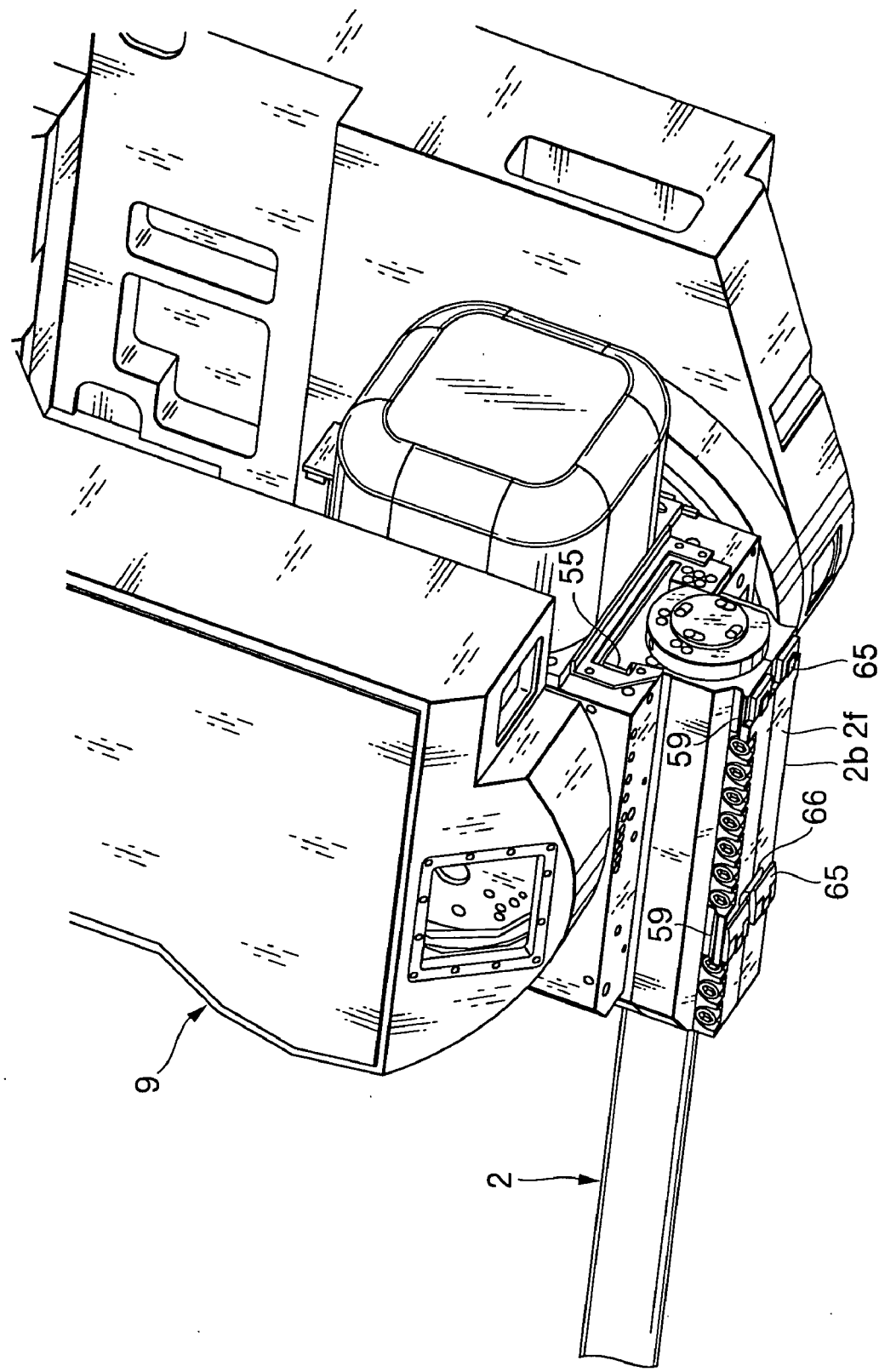
Figure 14:
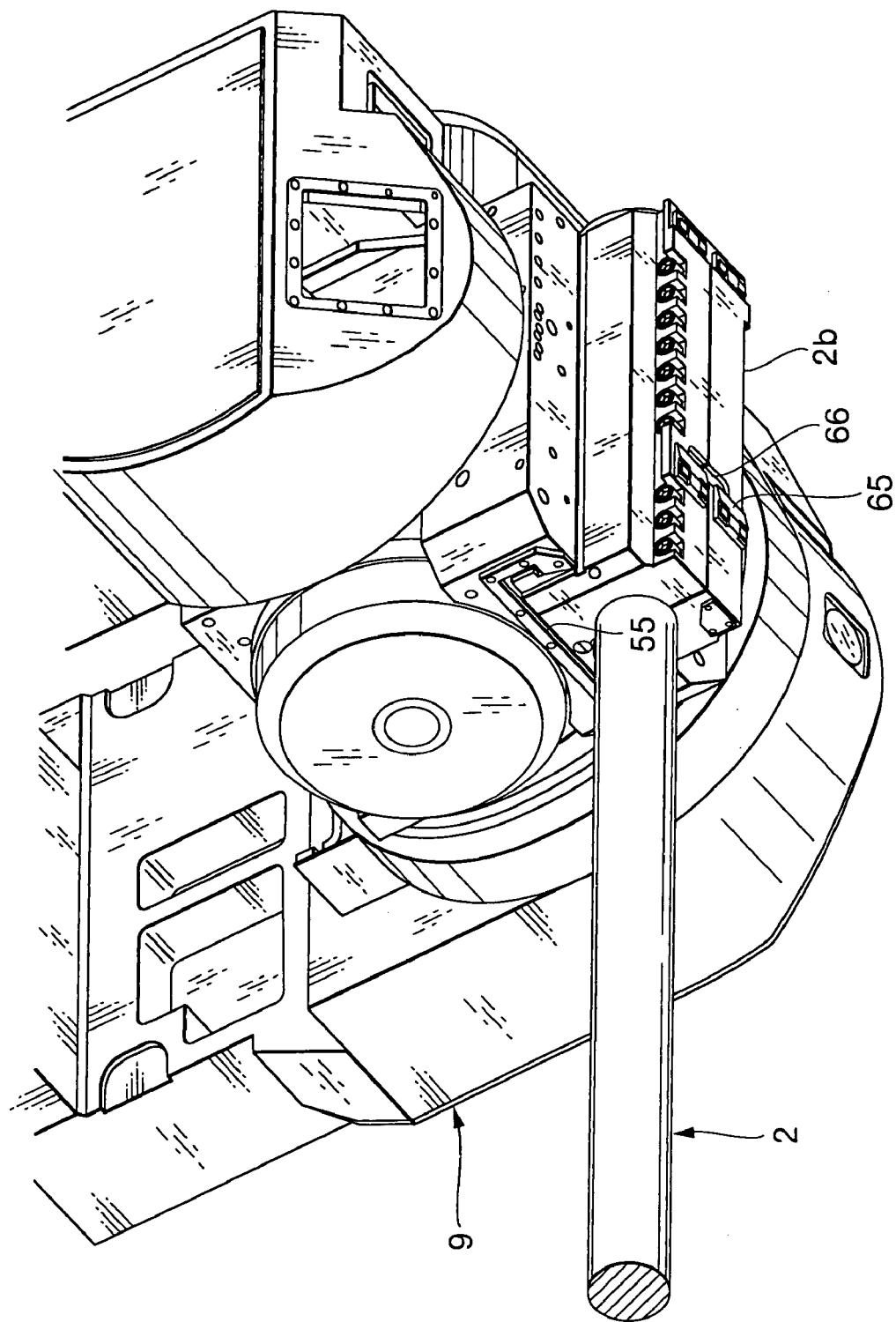
Figure 15:
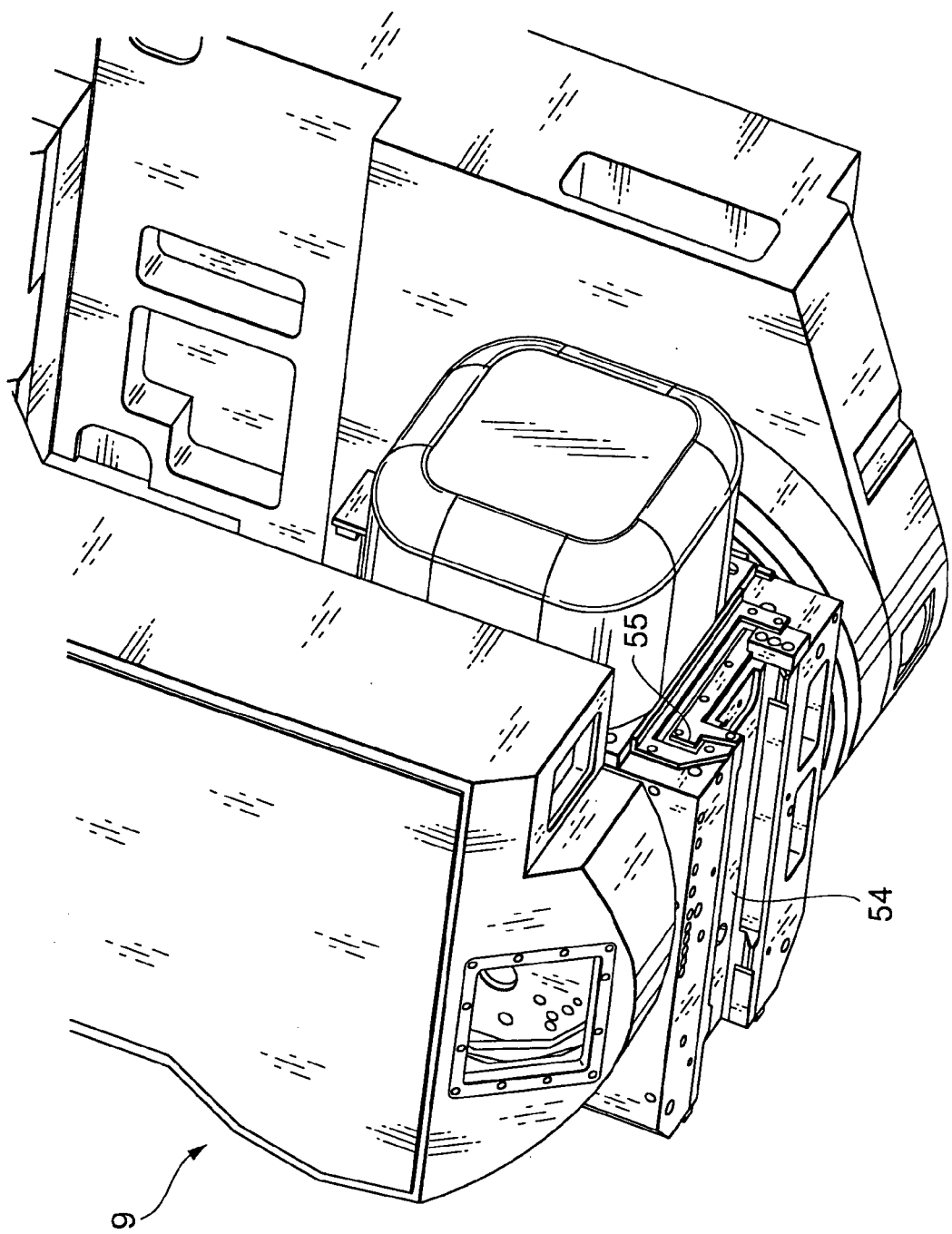
Figure 16:
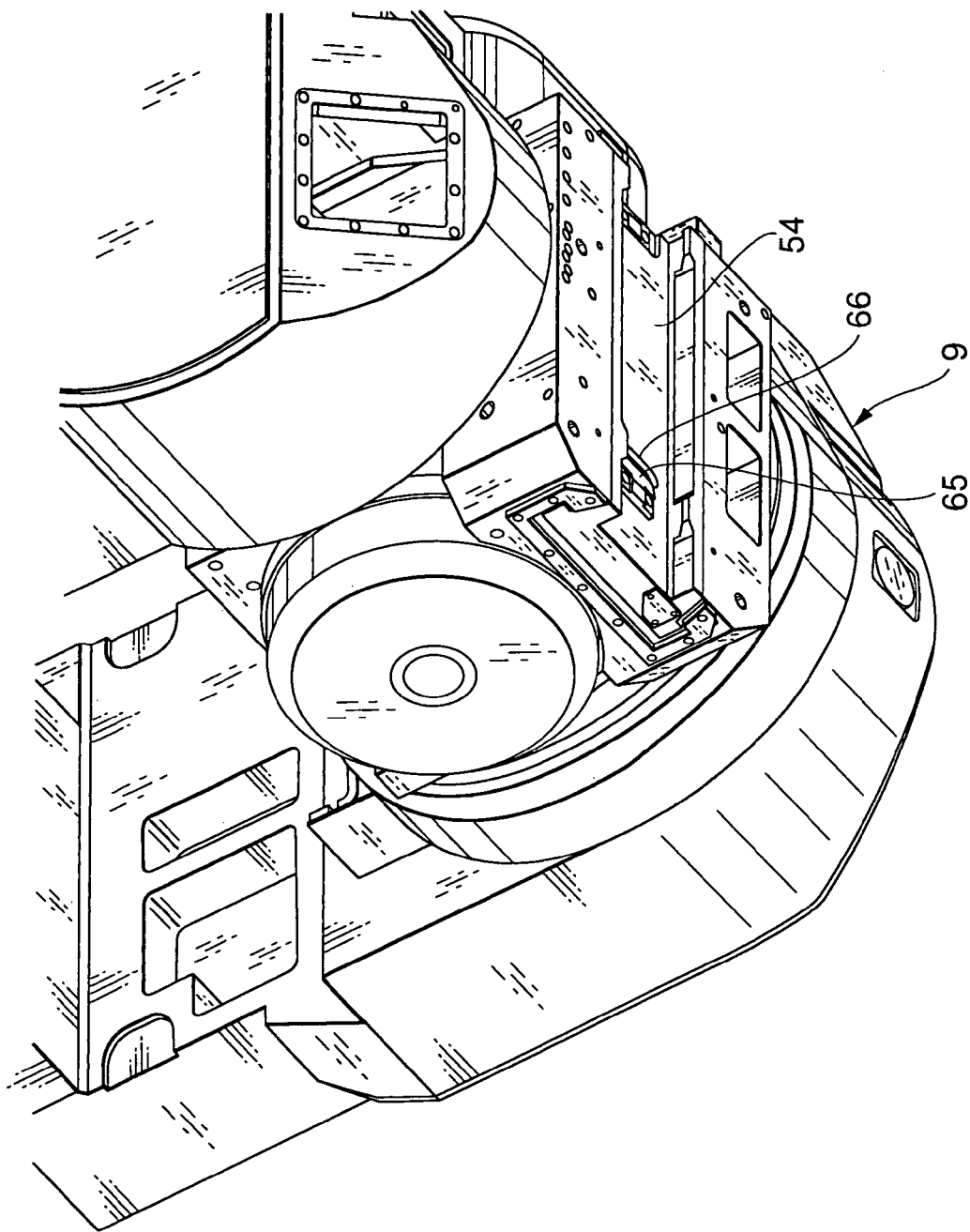
Figure 17:
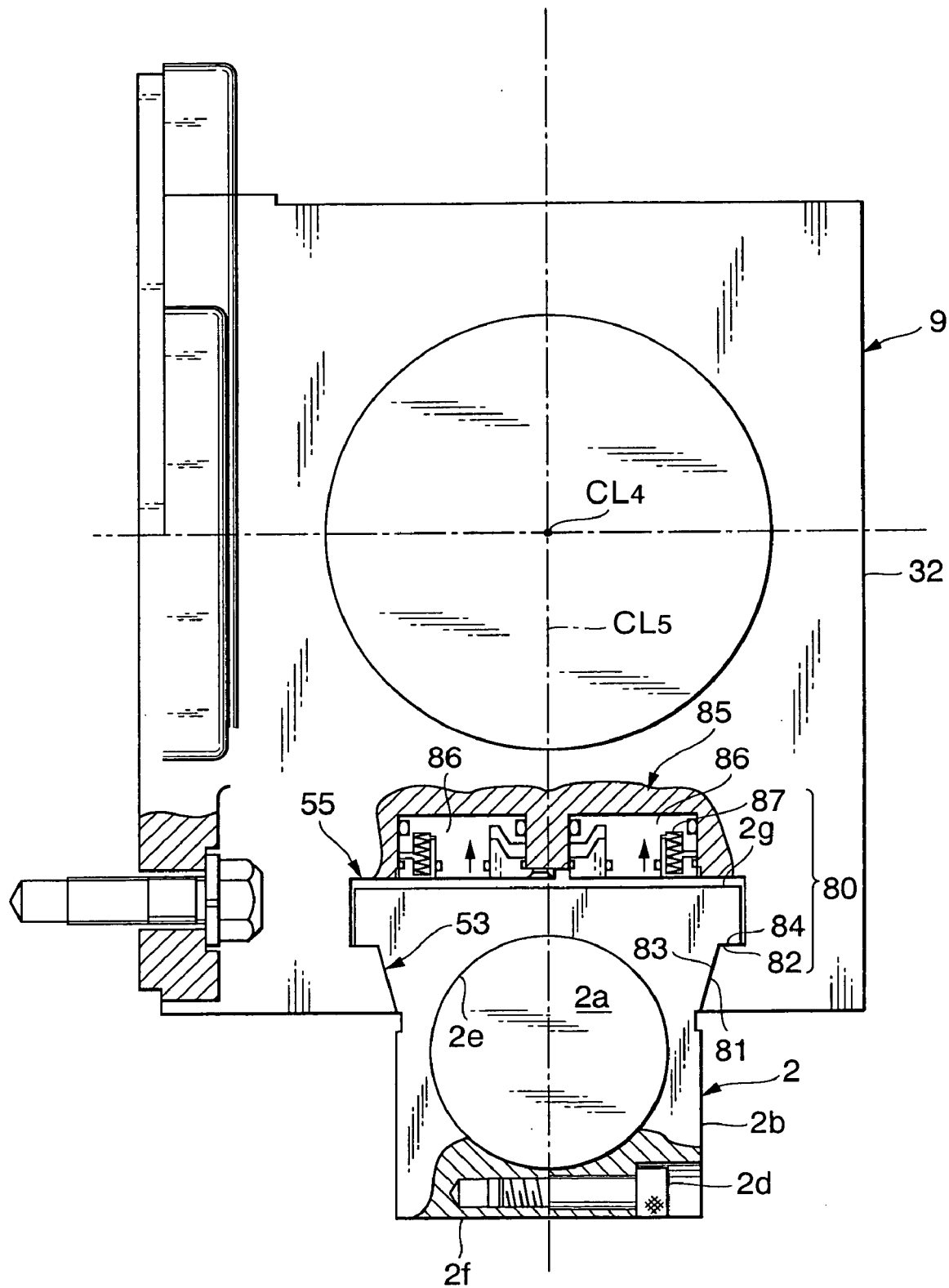
Figure 18:
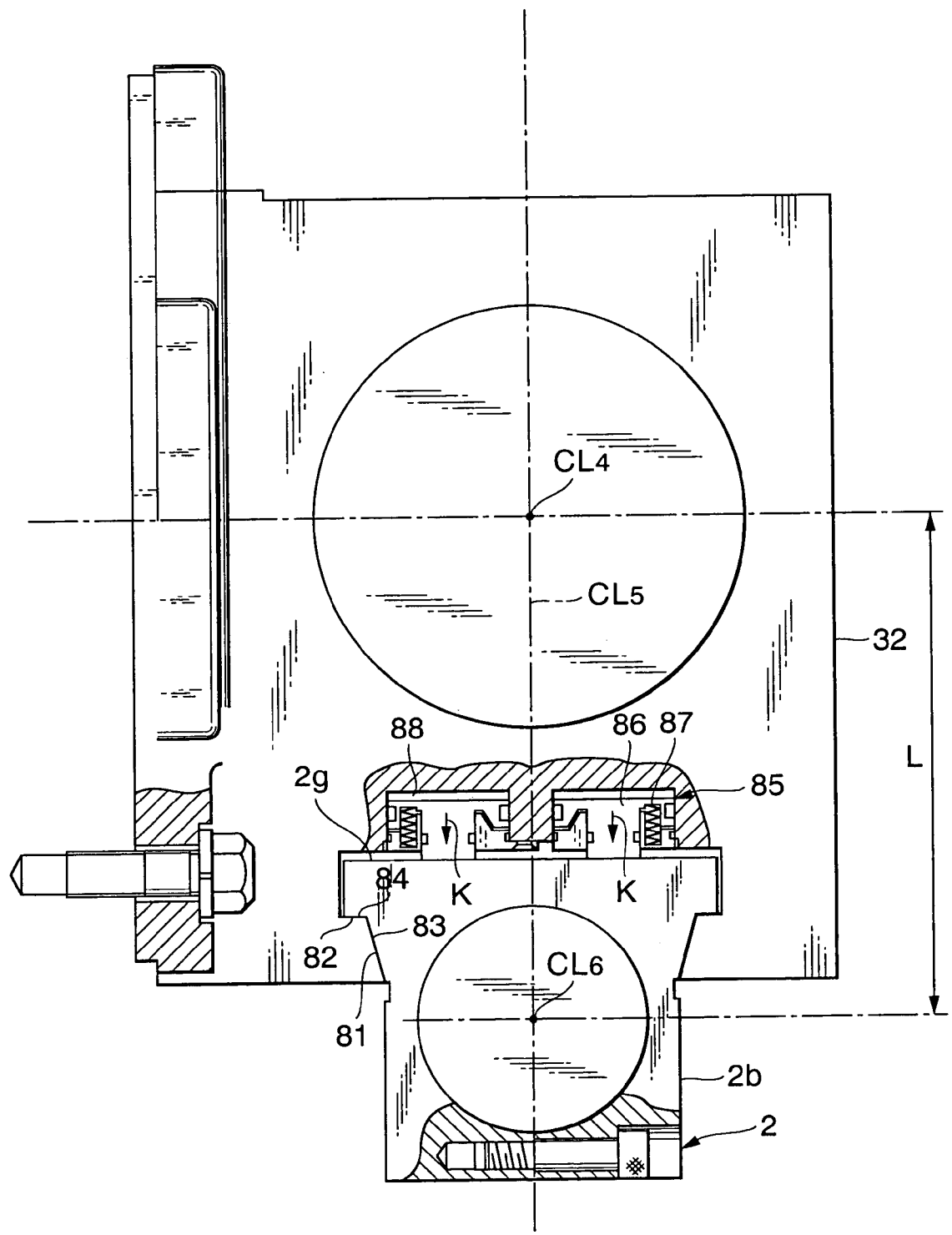

FIG. 11 and FIG. 12 are perspective views of a tool rest, respectively. FIG. 13 and FIG. 14 are partially enlarged perspective views of FIG. 11 and FIG. 12, respectively. FIG. 15 and FIG. 16 are partially enlarged perspective view of the condition that a boring bar has been removed, respectively. FIG. 17 and FIG. 18 are cross-sectional views of a clamping and unclamping mechanism. FIG. 17 shows an unclamped condition and FIG. 18 shows a clamped condition.

As shown in FIG. 1 to FIG. 4, a machine tool 1 is a multi-axis turning center having a boring bar magazine 10 (hereinafter referred to as a magazine 10).

The machine tool 1 has a function of a boring machine for boring a workpiece 3 with a boring bar 2. Also, the machine tool 1 has a function (functions of a normal lathe and a machining center) for performing various kinds of machining, other than the boring, to the workpiece 3 with tools other than the boring bar 2. In this embodiment, the function for boring with the machine tool 1 will now be described.

The boring bar 2 is a normal boring bar or a long boring bar. The workpiece 3 is, for example, a rod-shaped workpiece. The "various kinds of machining other than the boring" means the turning such as outside diametric machining, drilling, inside diametric machining, inside diametric screwing or the like or means a milling with a rotating tool such as outside diametric milling, outside diametric boring, ball end milling, oblique boring or the like.

The machine tool 1 is provided with a base 6 of the machine tool 1, a headstock 8 for supporting a main spindle 7, a tool rest 9 which may hold the boring bar 2, a magazine 10 which may stock the boring bars 2, a tool magazine (not shown) for stocking tools other than the boring bars 2, and an automatic tool changer (not shown) for changing these tools. The machine tool 1 is controlled by a controller 18 having an NC (numeral control) unit and a PLC (programmable logic controller).

A bed 15 of the machine tool 1 constitutes the base 6 and is mounted on a floor surface 16. The main spindle 7 has an axis CL1 directed substantially in a horizontal direction to the floor surface 16. A chuck 17 is provided at a tip end of the main spindle 7.

The headstock 8 is provided on the base 6 and is positioned on one side (left side in this case) out of the right and left directions of the machine tool 1 and supports the main spindle 7 to be rotatable. A direction in parallel to the axis CL1 of the main spindle 7 is regarded as a Z-axis direction (first direction, and the right and left direction in this case). Incidentally, the case in which the axis CL1 of the main spindle 7 is oblique at a predetermined angle from the horizontal direction is also included in "a case in which the main spindle axis is directed substantially in the horizontal direction".

The tool rest 9 is provided on the base 6 to be capable of supporting at least the boring bar 2. The tool rest 9 is movable in at least two directions of the Z-axis direction and an X-axis direction (a second direction and an oblique vertical direction in this case) perpendicular to the Z-axis direction.

A tailstock 11 is provided on the bed 15 to be capable of moving in the Z-axis direction. Incidentally, another headstock facing the headstock 8 may be provided, instead of the tailstock 11, at the position in which the tailstock 11 is located.

The magazine 10 is positioned on the other side (right side in this case) out of the right and left directions of the machine tool 1 and is provided on the base 6. The magazine 10 may stock one boring bar 2 or a plurality of boring bars 2 and may perform the swiveling and indexing operations.

The magazine 10 performs the swiveling operation about a centerline CL2 as indicated by an arrow E. Thus, the magazine 10 may index the boring bar 2 (or a vacant position for stocking the boring bar 2) at an index position P1.

The machine tool 1 may move the boring bar 2 of the tool rest 9 in at least two directions (Z-axis direction and X-axis direction) relative to the workpiece 3 gripped by the chuck 17 to thereby turn the workpiece 3.

The magazine 10 performs the swiveling and indexing operations. Accordingly, the tool rest 9 is positioned at the index position P1 by moving the tool rest 9 so that the boring bars 2 may be changed between the tool rest 9 and the magazine 10.

The magazine 10 is arranged in a right side position largely remote from the headstock 8. Accordingly, it is possible to interrupt the adverse affect such as heat and vibration between the magazine 10 and the headstock 8. Even if the headstock 8 generates heat due to a heat generating source such as a motor mounted on the headstock 8, there is no fear that the magazine 10 and the boring bar 2 would be thermally deformed. Since the motor, a pulley, belts or the like does not obstruct the operation of mounting the magazine 10, it is easy to design and to mount the magazine 10. Since the magazine 10 may be mounted directly on the bed 15, the rigidity of the magazine 10 is enhanced.

While the workpiece 3 gripped by the chuck 17 is machined with the boring bar 2 or another tool, it is possible to operate the magazine 10. Even in this case, the vibration of the magazine 10 would not propagate to the headstock 8 and there is no fear that the machining precision would be degraded.

The magazine 10 is disposed in a place in which the operationability is good for an operator. Accordingly, the operator may readily perform the operating work or the maintenance work to the magazine 10.

Since the machine tool 1 is the multi-axis turning center, the machine tool 1 performs various kinds of machining. Since the boring bar 2 is removed from the tool rest 9 and is stocked in the magazine 10 when the machine tool 1 performs the machining with other tool than the boring bar 2, there is no fear that the boring bar 2 would obstruct the machining operation.

The magazine 10 is adapted to move in the Z-axis direction (first direction) between a boring bar changing position P2 and a retracted position P3 as indicated by an arrow G.

When the boring bars 2 are changed between the tool rest 9 and the magazine 10, the magazine 10 is positioned at the boring bar changing position P2. Thus, since the moving distance through which the tool rest 9 is moved in the Z-axis direction for changing the boring bars 2 is shortened, it is possible to reduce a period of time to change the boring bars 2.

In the case other than the case in which the boring bars 2 are changed for each other, the magazine 10 is retracted to the retracted position P3. For this reason, since the magazine 10 does not obstruct during machining the workpiece 3, it is possible to increase a moving stroke of the tool rest 9 in the Z-axis direction.

Without waiting for the completion of the machining the workpiece 3, the operator may perform a setup work of the magazine 10 at the retracted position P3 during machining with the tool rest 9 so that the working efficiency may be enhanced.

Since the machine tool 1 is the multi-axis turning center, it is possible to mount a rotating tool other than the boring bar 2 onto the tool rest 9. Also, the tool rest 9 is movable also in the Y-axis direction (a third direction and an oblique back-and-force direction in this case) which is perpendicular to the Z-axis direction and the X-axis direction.

As a result, the tool rest 9 may be moved in three mutually transverse axes directions (X-axis direction, Y-axis direction and Z-axis direction). Further, since the tool rest 9 may be swiveled about the axis CL3 of the Y-axis direction as indicated by an arrow B, the machine tool 1 has a B-axis.

Accordingly, the rotating tool is mounted on the tool rest 9 and is rotated and the workpiece 3 gripped by the chuck 17 may be kept in a non-rotated condition. Thus, it is possible to perform cutting to the workpiece 3 in the same manner as a machining center. Since the tool rest 9 has the B-axis and may be swiveled, it is possible to perform oblique boring to the workpiece 3.

Thus, the machine tool 1 has a function of a machining center and a function of a regular lathe in addition to a function of the boring machine. Accordingly, it is possible for the machine tool 1 to perform the various kinds of machining, under the condition that the workpiece 3 is gripped by the chuck 17, and to perform a series of machining from the material workpiece to the final product.

A control unit 18 is disposed on a front right side of the base 6. A machining area 25 of the machine tool 1 is covered by a splash guard 26, an opening and closing cover 27 and the like so as to prevent chips or cutting fluid from splashing to the outside of the machining area 25.

A part or whole portion of the magazine 10 is located in the machining area 25 at the boring bar changing position P2 and the magazine 10 is located outside of the machining area 25 at the retracted position P3.

The base 6 is constituted by the bed 15, a saddle 24, a column 28 and the like. The saddle 24 movable in the Z-axis direction is supported by the bed 15. The column 28 is supported, by the saddle 24, to be movable in a Ya-axis direction (perpendicular to the Z-axis direction, horizontal and the back-and-forth direction). The column 28 supports the tool rest 9 to be movable in the X-axis direction. A moving body 29 movable in the Z-axis direction is constituted by the saddle 24, the column 28, the tool rest 9 and the like.

A pair of parallel Z-axis guide rails 34 is provided in the Z-axis direction on the bed 15. A slide body is fixed to the saddle 24. The Z-axis guide rails 34 and the slide body constitute a linear motion rolling guide. The saddle 24 is arranged to be movable in the Z-axis direction along the Z-axis guide rails 34.

A screw shaft of a Z-axis ball screw is arranged, in parallel to the Z-axis guide rails 34, between the two Z-axis guide rails 34. A ball nut fixed to the saddle 24 is screwed in the screw shaft. A Z-axis servomotor is mounted on the base 6. The Z-axis servomotor is adapted to drivingly rotate the screw shaft forwardly or reversely.

When the screw shaft is driven and rotated by the Z-axis servomotor, the saddle 24 to which the ball nut is fixed is moved reciprocatingly in the Z-axis direction while the saddle 24 is guided and supported by the pair of Z-axis guide rails 34. The moving motion of the moving body 29, including the saddle 24, the column 28 and the tool rest 9, becomes the movement of the tool rest 9 in the Z-axis direction relative to the workpiece 3 and the magazine 10.

A pair of parallel Ya-axis guide rails is provided in the Ya-axis direction on the saddle 24. A slide body is fixed to the column 28. The Ya-axis guide rails and the slide body constitute a linear motion rolling guide. The column 28 is disposed to be movable in the Ya-axis direction along the Ya-axis guide rails.

A screw shaft of a Ya-axis ball screw is arranged, in parallel to the Ya-axis guide rails, between the two Ya-axis guide rails. A ball nut fixed to the column 28 is screwed in the screw shaft. A Ya-axis servomotor is mounted on the base 6. The Ya-axis servomotor is adapted to drivingly rotate the screw shaft forwardly or reversely.

When the screw shaft is driven and rotated by the Ya-axis servomotor, the column 28, to which the ball nut is fixed, is moved reciprocatingly in the Ya-axis direction while the column 28 is guided and supported by the pair of Ya-axis guide rails.

A front surface 30 of the column 28 is slanted. The tool rest 9 is supported, to the column front surface 30, to be movable in the X-axis direction. A pair of parallel X-axis guide rails is provided in the X-axis direction on the column front surface 30.

A slide body is fixed to the tool rest 9. A box way is constituted by the X-axis guide rails and the slide body. The tool rest 9 is arranged in the X-axis direction along the X-axis guide rails.

A screw shaft of an X-axis ball screw is arranged, in parallel to the X-axis guide rails, between the two X-axis guide rails. This screw shaft constitutes an X-axis feeding mechanism for moving the tool rest 9 in the X-axis direction. A ball nut fixed to the tool rest 9 is screwed in the screw shaft.

An X-axis servomotor is mounted on an upper portion of the column 28. The X-axis servomotor drivingly rotates the screw shaft forwardly or reversely. When the screw shaft is driven and rotated by the X-axis servomotor, the tool rest 9 to which the ball nut is fixed is moved reciprocatingly in the X-axis direction while the tool rest 9 is guided and supported by the pair of X-axis guide rails. The moving motion of the tool rest 9 becomes the movement in the X-axis direction of the tool rest 9 relative to the workpiece 3 and the magazine 10.

The tool rest 9 has a slide 31, supported to the column 28, and a tool spindle head 32 supported to the slide 31. The tool such as the boring bar 2 and the rotating tool may be mounted on the tool spindle head 32. Also, the tool spindle head 32 is supported to the slide 31 to thereby perform the swiveling and indexing operations about the centerline CL3 as indicated by the arrow B.

The slide 31 is provided with a servomotor and a worm gear mechanism for performing the swiveling and-indexing operations of the tool spindle head 32. The tool spindle head 32 is provided with a drive motor 33 for drivingly rotating a rotating tool mounted on the tool spindle head 32.

A motion of the movement of the column 28 in the Ya-axis direction on the saddle 24 and a motion of the movement of the tool rest 9 in the X-axis direction relative to the column 28 are composed. As a result, the tool rest 9 may move also in the Y-axis direction.

Upon the changing motion of the boring bars 2 or the turning motion by the boring bar 2, the moving motion of the tool rest 9 in the Y-axis direction is not necessarily needed. However, when the cutting is performed while a tool such as the rotating tool is mounted on the tool spindle head 32, it is necessary to move this tool in the three mutually transverse axes directions. For this reason, upon the cutting by this tool, there are some cases in which the tool rest 9 is also moved in the Y-axis direction.

A chuck cylinder is provided, to the headstock 8, for driving a plurality (for example, three) of jaws 17a of the chuck 17. The jaws 17a of the chuck 17 are driven by the chuck cylinder to perform the opening and closing motions and to thereby grip and release the workpiece 3.

A spindle motor is provided in the headstock 8. The main spindle 7 rotatably supported to the headstock 8 is drivingly rotated by the spindle motor while the chuck 17 grips the workpiece 3.

Upon boring by the boring bar 2, the workpiece 3 gripped by the chuck 17 is rotated at predetermined rotational speeds by the main spindle 7 in the machining area 25. Then, the boring bar 2 mounted on the tool spindle head 32 of the tool rest 9 is relatively moved in the Z-axis direction and in the X-axis direction to thereby turn the workpiece 3.

As shown in FIG. 1 to FIG. 18, the magazine 10 is supported by a supporting base 40, fixed to the bed 15 and constituting the base 6, and is arranged on an upper portion of the supporting base 40. The magazine 10 has a base 41, arranged on the upper portion of the supporting base 40, and a magazine body portion 42 supported to the base 41 and extending in the Z-axis direction. A plurality (three at maximum) of boring bars 2 may be stocked around the magazine body portion 42.

A pair of parallel magazine guide rails 43 is provided in the Z-axis direction on the top surface of the supporting base 40. Slide bodies 44 are fixed to the base 41. The magazine guide rail 43 and the slide body 44 constitute a linear motion rolling guide. The base 41 is disposed to be movable in the Z-axis direction along the magazine guide rails 43.

A screw shaft 45 of a ball screw is disposed, in parallel to the magazine guide rails 43, between the two magazine guide rails 43. The screw shaft 45 constitutes a magazine feed mechanism for moving the magazine 10 in the Z-axis direction. A ball nut 46 fixed to the base 41 is screwed in the screw shaft 45.

A magazine feed servomotor 47 is mounted on the supporting base 40. The magazine feed servomotor 47 drives and rotates the screw shaft 45 forwardly or reversely through a coupling mechanism 48, which has a pulley, belts and the like, for coupling an output shaft of the servomotor 47 with the screw shaft 45.

If the screw shaft 45 is driven and rotated by the magazine feed servomotor 47, the magazine 10 to which the ball nut 46 is fixed is guided and supported to be moved reciprocatingly in the Z-axis direction by the magazine guide rails 43. Thus, the magazine 10 is moved in the Z-axis direction between the boring bar changing position P2 and the retracted position P3, retracted in the right direction from the position P2, as indicated by the arrow G.

The magazine body portion 42 is driven, by a magazine swiveling motor 49 supported to the base 41, to swivel about the centerline CL2 as indicated by an arrow E and thereby performs the indexing motion.

A boring bar 2 to be used next is indexed at the index position P1. In another case, a vacant portion (a vacant receiving portion 56 or a cover member receiving portion 57) for receiving the used boring bar 2 (or a tool rest cover member 54) from the tool rest 9 is indexed at the index position P1.

A boring bar mounting portion 55 (hereinafter referred to as a mounting portion 55) for detachably mounting the boring bar 2 is provided on the tool rest 9. This mounting portion 55 is formed to be extended in parallel with the centerline CL4 of the tool rest 9.

The mounting portion 55 has a "dovetail" groove 53 of which an inner portion expands gradually. The groove 53 is formed in the tool spindle head 32. The groove 53 extends in parallel with the centerline (centerline of the tool spindle head 32 in this case) CL4 of the tool rest 9.

The boring bar 2 is held by the tool spindle head 32 rather than the slide 31. The centerline CL6 (i.e., the centerline of the boring bar 2) of a tool holder 2b mounted on the mounting portion 55 of the tool spindle head 32 and the center line CL4 of the tool spindle head 32 are located at the same coordinates with respect to the Y-axis direction.

Namely, an original position of the Y-axis direction coordinate system of the boring bar 2 is identified with an original position of the Y-axis direction coordinate system of the tool (tool mounted on the tool mounting portion of the tool spindle head 32) other than the boring bar 2.

As a result, when the turning is performed by the boring bar 2, the original position of the Y-axis direction coordinate system in this case is not needed to be corrected to the original position of the Y-axis direction coordinate system in the case in which the machining is performed by the tool other than the boring bar 2. Accordingly, it is easy to control the moving operation of the tool rest 9. A program for controlling the machining operation by the boring bar 2 may be simplified.

When the boring bars 2 are changed with each other between the tool rest 9 and the magazine 10, the tool rest 9 is controlled so that the centerline CL4 of the tool rest 9 is directed in the direction (i.e., in the Z-axis direction) in parallel with the centerline CL2 of the magazine body portion 42. At this time, the centerline CL2 of the magazine body portion 42, the index position P1, mounting portion 55, and the centerline CL4 of the tool rest 9 are located on the same axis line CL5.

Thus, even if the tool rest 9 is not moved in the Y-axis direction, it is possible to change the boring bars 2 between the tool rest 9 and the magazine 10. Accordingly, the control in the Y-axis direction is not needed for the changing operation of the boring bars 2, and the program for controlling the changing operation is simplified.

The boring bar 2 has a boring bar tool 2a extending in the axial direction with a tool tip portion 2c at its tip end, the tool holder 2b for holding the boring bar tool 2a, and the like. The boring bar tool 2a is detachably fastened and fixed to the tool holder 2b by a fastening means such as a plurality of bolts 2d. The boring bar tool 2a is engaged with a boring bar engagement hole 2e inside of the tool holder 2b and is fastened and fixed to the tool holder 2b by the plurality of bolts 2d.

The tool holder 2b is formed into a predetermined sleeve shape extending in the axial direction of the boring bar 2. The tool holder 2b is detachably supported to and received on the magazine body portion 42.

The magazine body portion 42 has three receiving portions 56 and a single plain surface portion 56a and forms a substantially rectangular shape as viewed from side. The boring bars 2 may be received in the three receiving portions 56, respectively. A cover member receiving portion 57 for receiving a dummy tool rest cover member 54 is fixed to the plain surface portion 56a.

FIG. 4 to FIG. 9 show a case in which the tool rest cover member 54 is received in the cover member receiving portion 57. The tool rest cover member 54 is used to be mounted on the mounting portion 55 and to cover the mounting portion 55 while the turning by the boring bar 2 is not to be performed.

Incidentally, the receiving portion 56 may be formed instead of the cover member receiving portion 57 on the plain surface portion 56a, on which the cover member receiving portion 57 is mounted, so that the boring bar 2 may be received in this receiving portion 56. Thus, it is possible to receive the four, in total, boring bars 2 on the magazine body portion 42.

The magazine body portion 42 may swivel. Accordingly, if the diameter of the magazine body portion 42 is increased, it is possible to stock a larger number of the boring bars 2 in the magazine 10.

Each two (eight in total) pressing members 58 are provided on four corner portions of the magazine body portion 42. The pressing members 58 have a substantially T-shape as viewed from side and are arranged radially about the centerline CL2 and are fixed to the magazine body portion 42.

Engaged portions 59 are formed on positions corresponding to the pressing members 58 in the tool holder 2b. Namely, the four (in total) engaged portions 59 are formed on the single tool holder 2b. In the same manner, the engaged portions 59 are formed at the four positions also in the cover member receiving portion 57. The engaged portions 59 are retained by the pressing members 58 so that each tool holder 2b is retained from both sides by the pressing members 58.

Each tool holder 2b is engaged with the magazine body portion 42 on a first side surface portion 2f on which the engaged portions 59 and the bolts 2d are arranged. A second side surface portion 2g positioned at 180 degrees opposite to the first side surface portion 2f is to be mounted on the mounting portion 55 of the tool rest 9.

A stopped portion 69 is formed on each receiving portion 56 of the magazine body portion 42. The tool holder 2b is seated on the stopped portion 69 and then is positioned in the Z-axis direction. Also, a Z-axis direction sensor for detecting the seating of the tool holder 2b in the Z-axis direction is provided on the receiving portion 56.

When the tool holder 2b is seated in the Z-axis direction in contact with the stepped portion 69 of the receiving portion 56, the moving operation in the Z-axis direction of the moving body 29 including the tool rest 9 is stopped in accordance with a signal outputted from the Z-axis direction sensor.

The magazine body portion 42 has a retaining and releasing mechanism 60 (hereinafter referred to as a retainer mechanism 60) for retaining and releasing the tool holder 2b and the tool rest cover member 54, respectively. The retainer mechanism 60 may retain and release the tool holders 2b received in the three receiving portions 56 of the magazine body portion 42 independently of each other. Also, the retainer mechanism 60 may retain or release the tool rest cover member 54 received in the cover member receiving portion 57 of the magazine body portion 42 independently.

The retainer mechanism 60 has four shafts 61, which are provided in the interior of the magazine body portion 42 and are movable reciprocatingly in the axial direction, and four moving members 70 movable in a direction perpendicular to the moving direction of the shafts 61.

A shaft driving portion 67 for moving and operating the four shafts 61 independently of each other is provided in the magazine body portion 42. When the shaft driving portion 67 is driven, it is possible to move each shaft 61 as indicated by an arrow H1. Thus, the moving member 70 is moved through a cam mechanism 62 as indicated by an arrow H2.

A plurality (four in this case) of pressing members 63 and a single projecting portion 64 are provided on the moving member 70. The projecting portion 64 is formed integrally with at a tip end portion of the moving member 70. The pressing members 63 are coupled with the moving member 70.

When the moving member 70 is moved, the pressing members 63 and the projecting portion 64 are also moved together. The pressing member 63 is moved outwardly to make it possible to press the tool holder 2b or the tool rest cover member 54.

The moving member 70, the pressing members 63 and the projecting portion 64 are provided for each of the three receiving portions 56 and the single cover member receiving portion 57 of the magazine body portion 42. The pressing members 63 and the projecting portion 64 are moved reciprocatingly together to perform the operation of the advance and reverse (retraction) movements from the receiving portion 56 and the cover member receiving portion 57.

The first side surface portion 2f of the tool holder 2b is provided with a plurality (four in this case) of pressed portions 65 to be pressed in contact with the pressing members 63, and a single recess portion 66 engageable with and disengageable from the projecting portion 64.

The pressed portions 65 are arranged next to the engaged portions 59, and also, the recess portion 66 is formed adjacent to the pressed portions 65. The same structure of the pressed portions 65 and the recess portion 66 is applied to the tool rest cover member 54. Also, engaged portions 59a are formed on the tool rest cover member 54. The engaged portions 59a are retained to be engaged and disengaged with retainer portions 71 formed on the cover member receiving portion 57.

The retainer mechanism 60 is constituted by the shaft driving portion 67, the shaft 61, the cam mechanism 62, the moving member 70, the pressing members 63, the projecting portion 64 and the pressing members 58, which are provided on the magazine body portion 42, and the pressed portions 65, the recess portion 66 and the engaged portions 59 which are provided on the tool holder 2b, and the like.

If, under the condition that the pressing member 58 and the engaged portion 59 are in engagement with each other, the pressing member 63 depresses the pressed portion 65 so that the engaged portion 59 is strongly depressed against the pressing member 58 and is retained thereat. Under this condition, the projecting portion 64 is engaged with the recess portion 66 and prevents each other from pulling apart. Therefore, the tool holder 2b is positioned and held without being pulled apart from the magazine body portion 42. Thus, the boring bar 2 is held to the magazine body portion 42.

In case of the tool rest cover member 54, under the condition that the retainer portion 71 and the engaged portion 59a are engaged with each other, the pressing member 63 depresses the pressed portion 65. Thus, the engaged portion 59a is depressed strongly against the retainer portion 71 and is retained thereat. Under this condition, the projecting portion 64 is engaged with the recess portion 66 and prevents each other from pulling apart. Therefore, the tool rest cover member 54 is positioned and held to the cover member receiving portion 57 without being pulled apart from the cover member receiving portion 57.

In the thus constructed retainer mechanism 60, the shaft driving portion 67 is driven so that the shaft 61 is drawn in the right direction (toward shaft driving portion 67). Then, the pressing members 63 and the projecting portion 64 are retracted backwardly through the cam mechanism 62 and are kept under the condition that they are not projecting from the receiving portion 56.

Under this condition, the tool rest 9 is moved in the right direction and the tool holder 2b is moved to one receiving portion 56. The tool holder 2b is seated and positioned at the stopped portion 69 in the Z-axis direction. The shaft driving portion 67 is driven in accordance with a signal outputted from the Z-axis direction sensor 68.

The shaft 61 for this receiving portion 56 is moved in the left direction (opposite to the shaft driving portion 67). Then, the pressing members 63 and the projecting portion 64 project from the receiving portion 56 through the cam mechanism 62 and the moving member 70.

As a result, since the pressing members 63 depress the pressed portions 65 of the tool holder 2b, the engaged portions 59 are depressed against the pressing members 58. The projecting portion 64 projecting from the receiving portion 56 together with the pressing members 63 enters into and is engaged with the recess portion 66 of the tool holder 2b. Incidentally, in order to release the retention of the tool holder 2b from the receiving portion 56, the shaft driving portion 67 is driven to draw the shaft 61 in the right direction. Then, the operation opposite to the above-described operation is performed so that the tool holder 2b may be released from the magazine body portion 42.

Thus, the pressed portions 65 of the tool holder 2b are depressed by the pressing members 63 of the retainer mechanism 60. Also, the engaged portions 59 of the tool holder 2b are depressed against the pressing members 58 on the magazine body portion 42. Thus, the tool holder 2b is held to the receiving portion 56.

Thus, the retainer mechanism 60 utilizes the pressing force. Accordingly, the structure may be simplified and is possible to obtain a larger retention force in comparison with the conventional structure for holding the tool holder by the tensional force.

The above-retainer mechanism 60 is a structure in which the pressing members 63 are coupled with the moving member 70 to move together. Incidentally, it is possible to use a modification in which the pressing members 63 are fixed to the magazine body portion 42 and the cover member receiving portion 57, respectively, and only the moving member 70 is moved.

In case of this modification, the pressing member 63 fixed to the magazine body portion 42 and the pressed portion 65 of the tool holder 2b exhibit the function of the guide means for positioning when the tool holder 2b is engaged with the magazine body portion 42. In the same manner, the pressing members 63 fixed to the cover member receiving portion 57 and the pressed portions 65 of the tool rest cover member 54 exhibit the function of the guide means for positioning when the tool rest cover member 54 is engaged with the cover member receiving portion 57.

Then, the projecting portion 64 of the moving member 70 is engaged with the recess portion 66 of the tool holder 2b to depress the tool holder 2b. Under the condition that the pressing members 58 and the engaged portion 59 are engaged with each other, when the moving member 70 depresses the tool holder 2b, the engaged portions 59 are strongly depressed against the pressing members 58 and are retained thereat. As a result, the tool holder 2b is positioned and retained to the magazine body portion 42. Thus, the boring bar 2 is retained to the magazine body portion 42.

On the other hand, in case of the tool rest cover member 54, the projecting portion 64 of the moving member 70 is engaged with the recess portion 66 of the tool rest cover member 54 and depresses the tool rest cover member 54. Under the condition that the retainer portions 71 and the engaged portions 59a are engaged with each other, when the moving member 70 depresses the tool rest cover member 54, the engaged portions 59a are strongly depressed to the retainer portions 71 and are retained thereat. As a result, the tool rest cover member 54 is positioned and retained to the cover member receiving portion 57. Thus, also in the modification, the same effect as that of the present embodiment may be ensured.

In this embodiment, the tool holder 2b of the boring bar 2 is mounted on the mounting portion 55 provided on the tool rest 9 and may be clamped and unclamped by the clamping and unclamping mechanism 80 (hereinafter referred to as a clamping mechanism 80). FIG. 17 shows a condition that the tool holder 2b is unclamped to the tool rest 9. FIG. 18 shows a condition that the tool holder 2b is clamped by the clamping mechanism 80.

The clamping mechanism 80 has holder side tapered surfaces 81 and holder side plain end faces 82 continuous with the holder side tapered surfaces 81. The holder side tapered surfaces 81 and the holder side plain end faces 82 are formed on the tool holder 2b and extend in a direction in parallel with the centerline CL6 of the tool holder 2b, respectively.

Also, the clamping mechanism 80 has tool rest side tapered surfaces 83 and tool rest side plain end faces 84 continuous with the tool rest side tapered surfaces 83. The tool rest side tapered surface 83 and the tool rest side plain end face 84 are formed on the mounting portion 55 of the tool rest 9 and extend in a direction in parallel with the centerline CL4 of the tool rest 9, respectively.

Furthermore, the clamping mechanism 80 has cylinder portions 85 which are provided in the mounting portion 55 and are controlled. The cylinder portions 85 are arranged at a position facing the second side surface portion 2g of the tool holder 2b. In order to obtain a large clamping force as a whole, pluralities (eight in this case) of cylinder portions 85 are provided in the mounting portion 55.

The clamping mechanism 80 is adapted to directly depress the tool holder 2b by pistons 86 of the cylinder portions 85. Thus, the holder side plain end faces 82 and the holder side tapered surfaces 81 are depressed against the tool rest side plain end faces 84 and the tool rest side tapered surfaces 83, respectively, so that the tool holder 2b is clamped to the tool rest 9.

By the way, in the above-described conventional clamping and unclamping mechanism, the tool holder is indirectly clamped through a clamping part. In contrast, in the clamping mechanism 80 in this embodiment, the clamping part which has been conventionally used is not used, and the pressing force is directly utilized instead of the tensional force.

More specifically, since the pistons 86 are used to directly depress the tool holder 2b, a dimension L between the centerline CL4 of the tool rest 9 and the centerline CL6 of the tool holder 2b is shortened. As a result, when the turning is performed by the boring bar 2, a moment by a force applied to the machining position becomes small. Accordingly, the stress to be applied to the position adjacent to the mounting portion 55 becomes small and the rigidity of the tool holder 2b and the tool rest 9 as a whole is high. Since parts such as clamping part may be dispensed with, the structure of the clamping mechanism 80 is simplified.

In the clamping mechanism 80, the pistons 86 are normally biased on the retracted position side by the spring force of compression springs 87 as shown in FIG. 17. When the pistons 86 are retracted to the retracted position, the tool holder 2b moves, without interfering with the pistons 86, within the groove 53 of the mounting portion 55 so that the tool holder 2b may be mounted and removed.

Pressure fluid (for example, pressure oil or compression air) is supplied to the cylinder chamber 88 of cylinder portion 85. Thus, as indicated by an arrow K in FIG. 18, the pistons 86 are advanced toward the tool holder 2b from the retracted position against the spring force of the compression spring 87 to thereby depress the second side surface portion 2g.

Thus, the holder side plain end face 82 depresses the tool rest side plain end face 84. Also, the holder side tapered surface 81 depresses the tool rest side tapered surface 83. As a result, the tool holder 2b is positioned with high precision and clamped to the tool rest 9 since the tool holder 2b is bound in two surfaces by a plain end face portion and a tapered portion.

FIG. 11 to FIG. 14 show a condition that the tool holder 2b of the boring bar 2 is mounted on the mounting portion 55 of the tool rest 9.

The tool rest cover member 54 as a dummy may be mounted on the mounting portion 55. Therefore, FIG. 15 and FIG. 16 show a condition that the tool rest cover member 54 is mounted on the mounting portion 55. As a result, the mounting portion 55 is covered by the tool rest cover member 54. Accordingly, there is no fear that chips and cutting fluid would enter the interior of the mounting portion 55.

Figure 19:
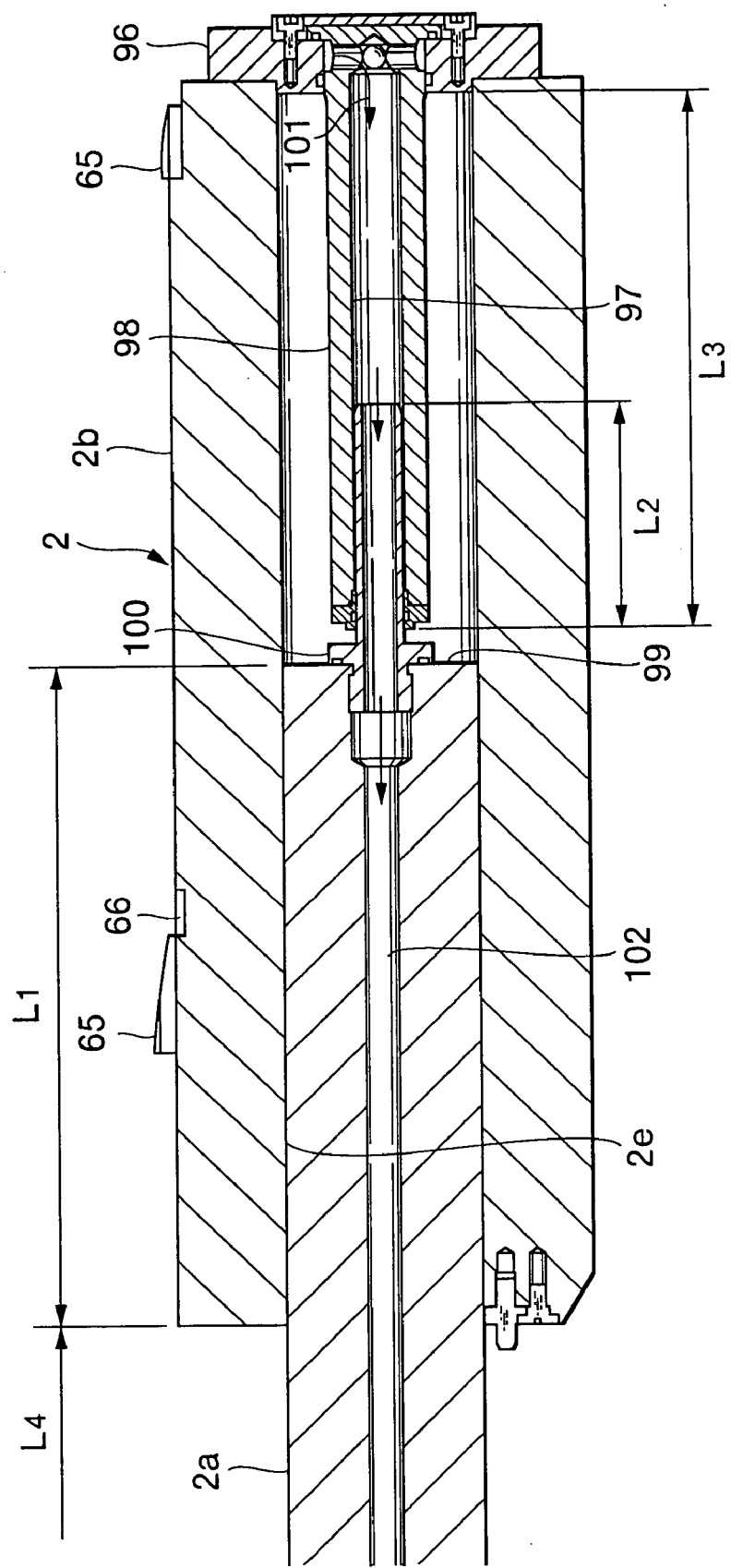
Figure 20:
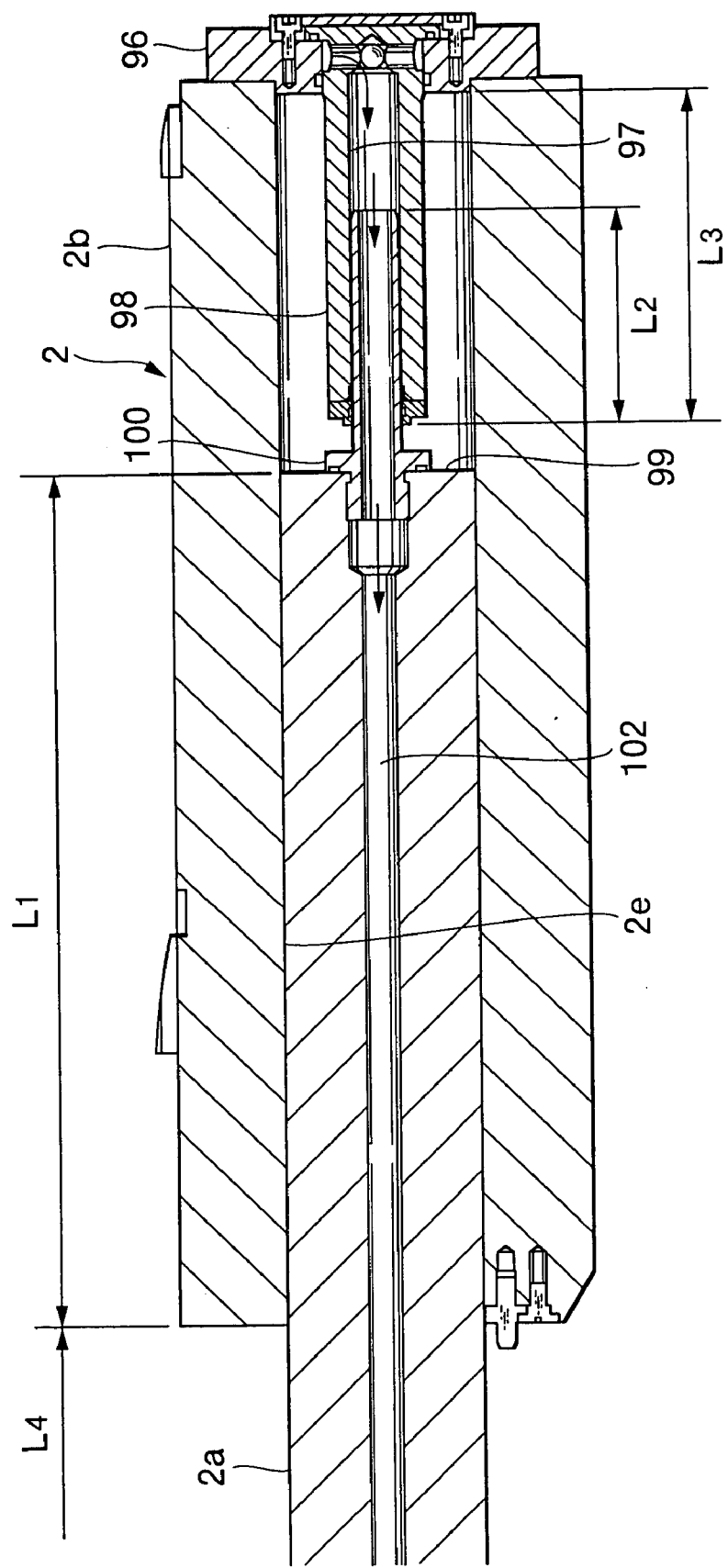
Figure 21:
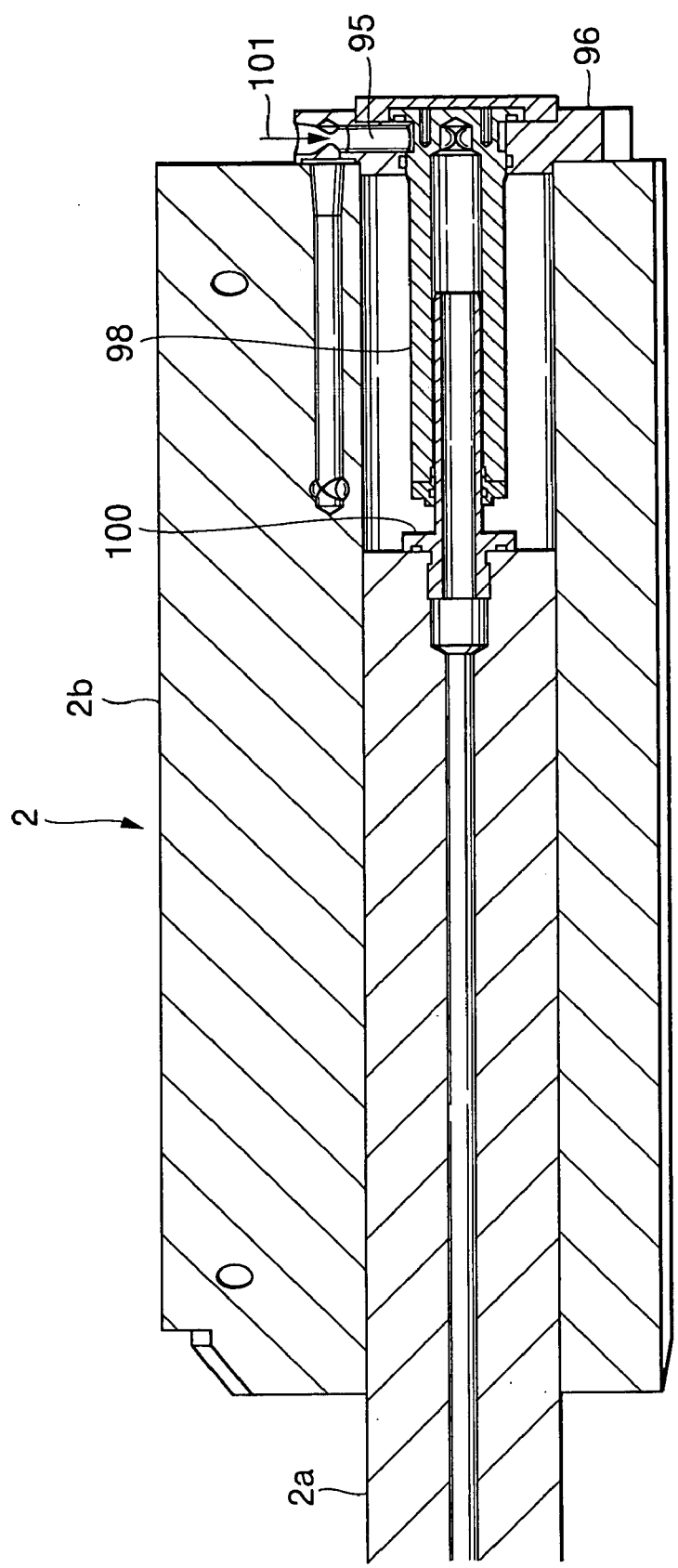
Figure 22:
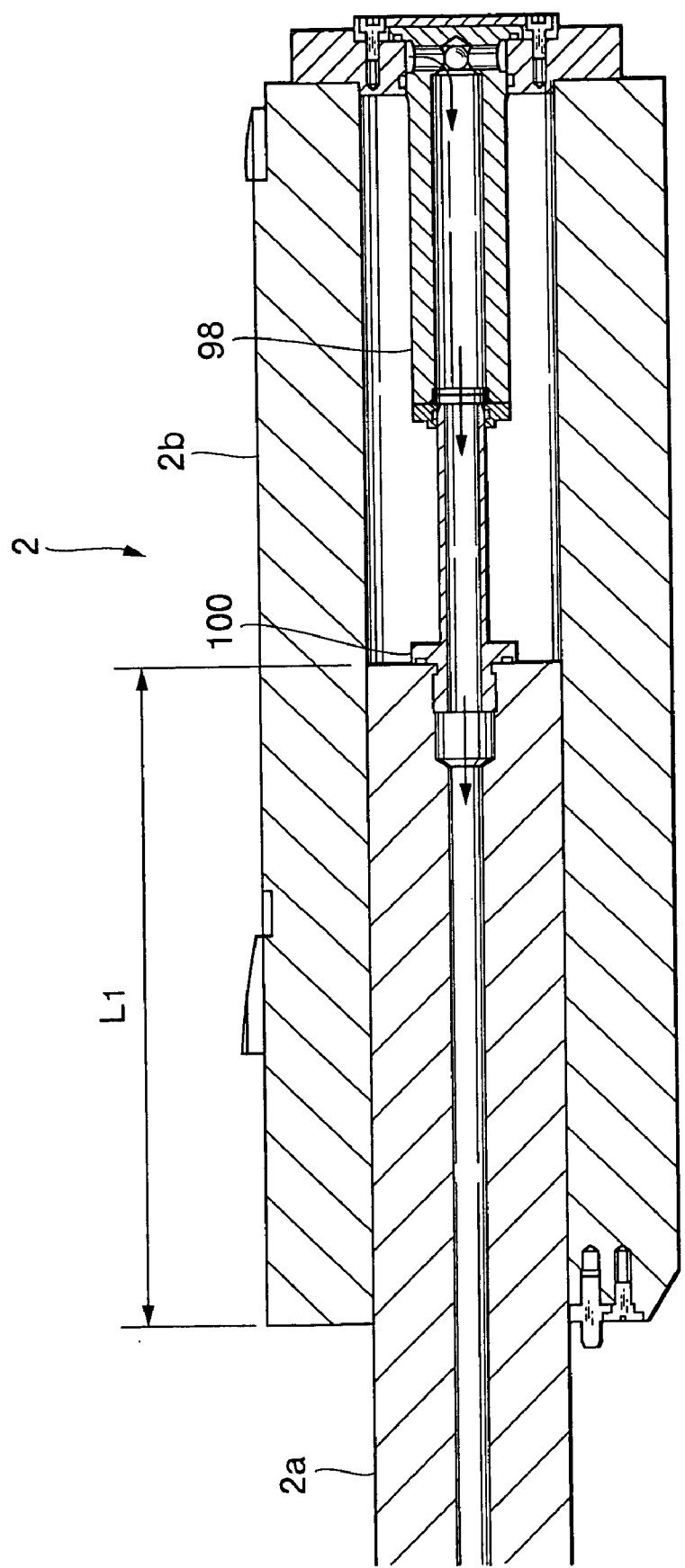

FIG. 19 is a cross-sectional view of the boring bar 2. FIG. 20 is a cross-sectional view of the boring bar 2 in which the boring bar tool 2a is inserted deeply and a short projecting member 98 is used. FIG. 21 is a cross-sectional view of the boring bar 2 which is shown in a different direction at 90 degrees from FIG. 20. FIG. 22 is a cross-sectional view of the boring bar 2 in which the short projecting member 98 is used and the boring bar tool 2a is inserted shallowly.

As shown in FIG. 19 to FIG. 22, a boring bar engagement hole 2e is formed through the tool holder 2b in the longitudinal direction. The boring bar tool 2a is inserted into the engagement hole 2e from one side (the left side in this case) of the engagement hole 2e by any desired first insertion depth dimension L1 and is engaged with each other. The boring bar tool 2a inserted into the boring bar engagement hole 2e is positioned and fixed by a plurality of bolts (fastening members) 2d provided on the tool holder 2b.

A lid member 96 which has, in its interior, a cutting fluid feed pathway 95 (hereinafter referred to as a flow path 95) and which covers the boring bar engagement hole 2e is mounted detachably on the other side (the right side in this case) of the tool holder 2b. The projecting member 98 projecting into the interior of the boring bar engagement hole 2e is mounted on the lid member 96. A nozzle engagement hole 97 in communication with the flow path 95 is formed in the projecting member 98.

A nozzle 100 is screwed and mounted on an end portion (right side end portion in this case) 99 of the boring bar tool 2a. The nozzle 100 is inserted into the nozzle engagement hole 97 by any desired second insertion depth dimension L2 and is engaged with each other.

The cutting fluid 101 runs from the flow path 95 of the lid member 96 through the nozzle engagement hole 97 of the projecting member 98, the nozzle 100 and an inside flow path 102 of the boring bar tool 2a in this order and then injects outwardly from the boring bar 2.

Since the tool holder 2b is divided at the positions on which the bolts 2d are mounted, the interior of the boring bar engagement hole 2e is not a hermetical space. For this reason, it is impossible to directly feed the cutting fluid 101 into the boring bar engagement hole 2e. Therefore, as in this embodiment, it is possible to keep the flow path, through which the cutting fluid 101 runs, by using the lid member 96, the projecting member 98 and the nozzle 100.

In the boring bar 2, it is possible to change at least one dimension out of the first insertion depth dimension L1 of the boring bar tool 2a inserted into the boring bar engagement hole 2e, the second insertion depth dimension L2 of the nozzle 100 inserted into the nozzle engagement hole 97 and the length dimension L3 of the projecting member 98, respectively.

For this reason, there are a case in which the projecting member 98 is replaced by another projecting member 98 having a different length dimension L3, a case in which a nozzle 100 is replaced by another nozzle 100 having a different length dimension, a case in which the first insertion depth dimension L1 and the second insertion depth length L2 are changed without changing the projecting member 98 and the nozzles 100, and the like.

It is thus possible to adjust the length dimension L4 of the boring bar tool 2a extending outwardly from the tool holder 2b while keeping the flow path through which the cutting fluid 101 runs.

For example, in FIG. 20 and FIG. 21, the projecting member 98 is replaced by a projecting member 98 having a short length dimension L3, and the boring bar tool 2a is deeply inserted into the tool holder 2b. Thus, the insertion depth dimension L1 may be increased.

In contrast, in FIG. 22, the projecting member 98 having the same length dimension L3 as that of the projecting member 98 shown in FIG. 20 and FIG. 21, and the boring bar tool 2a is inserted into the tool holder 2b shallowly. Thus, the first insertion depth dimension L1 is decreased.

Thus, it is possible to adjust the projecting length dimension L4 of the boring bar tool 2a to any desired one by using the common boring bar tool 2a and tool holder 2b. Also, even if a different type boring bar tool 2a in which the length of the boring bar tool 2a is different is used, it is possible to use the common tool holder 2b. Accordingly, in case of storing expensive boring bar tools 2a and tool holders 2b, it is possible to reduce the number of the stock parts and the number of kinds of the stock parts.

The operation of the machine tool 1 and the steps for changing the boring bars 2 will now be described.

In case of boring, the boring bar 2 mounted on the mounting portion 55 is positioned toward the direction in parallel to the Z-axis direction. Under the condition that the workpiece 3 is gripped by the chuck 17, the main spindle 7 is rotated at predetermined rotational speeds.

Then, the tool rest 9 is moved in the Z-axis direction and in the X-axis direction and it is possible to turn the workpiece 3 by the boring bar 2. At this time, since the magazine 10 is retracted to the retracted position P3, the magazine 10 will not obstruct the operation.

In case of changing the boring bars 2, the magazine feed servomotor 47 is driven. Then, the magazine 10 is moved in the left direction from the retracted position P3 to the boring bar changing position P2. The magazine swivel motor 49 is driven so that magazine body portion 42 is swiveled and the vacant receiving portion 56 is indexed at the index position P1.

The tool rest 9 is moved in the X-axis direction so that the center of the boring bar 2 held by the tool rest 9 is identical with the center of the index position P1 on the same axis.

After the magazine 10 is positioned at the boring bar changing position P2, the moving body 29 including the tool rest 9 is moved in the right direction in the Z-axis direction. Then, the tool holder 2b is brought into contact with the stepped portion 69 of the magazine body portion 42. Then, Z-axis direction sensor confirms the seating of the tool holder 2b in the Z-axis direction and outputs a signal. Thus, the moving motion of the moving body 29 in the Z-axis direction is stopped. Under this condition, the position of the engaged portions 59 of the tool holder 2b are identified with the position of the pressing members 58 of the magazine body portion 42.

Subsequently, the shaft driving portion 67 is driven and the retainer mechanism 60 is operated. Then, the pressing members 63 depress the pressed portions 65 of the tool holder 2b and at the same time, the projecting portion 64 engages with the recess portions 66.

The engaged portions 59 of the tool holder 2b are depressed against the pressing members 58. Then, the boring bar 2 is positioned and held in the receiving portion 56. Also, the projecting portion 64 engages with the recess portion 66 and prevents the tool holder 2b from falling apart.

Thus, after the tool holder 2*b* has been held to the magazine body portion 42, the clamping mechanism 80 of the tool rest 9 is operated. Namely, the feed of the pressure fluid into the cylinder chamber 88 is stopped, and the cylinder chamber 88 is released to an atmospheric pressure. Then, since the pistons 86 are separated from the tool holder 2*b* by the spring force of the compression spring 87, the holder which has been clamped so far is brought into the unclamped condition.

Thereafter, the moving body 29 is moved in the left direction in the Z-axis direction and the mounting portion 55 is separated away from the tool holder 2*b*.

Subsequently, the magazine swivel motor 49 is driven to swivel the magazine body portion 42, and the boring bar 2 to be used next is indexed at the index position P1. The moving body 29 is moved in the right direction, and a tool holder 2*b* which is indexed is mounted on the mounting portion 55.

Subsequently, the pressure fluid is fed into the cylinder chamber 88 to thereby depress the tool holder 2*b* by the pistons 86. Thus, the holder side plain end faces 82 and the holder side tapered surfaces 81 are depressed to the tool rest side plain end faces 84 and the tool rest side tapered surfaces 83, respectively. As a result, the tool holder 2*b* is clamped to the tool rest 9.

Thereafter, the shaft driving portion 67 is driven and the retainer mechanism 60 is operated to thereby retract the pressing members 63 and the projecting portion 64. Thus, the tool holder 2*b* is released from the retention of the receiving portion 56 to thereby complete the change of the boring bars 2.

If the moving member 29 is moved in the left direction and the boring bar 2 held to the tool rest 9 is separated from the magazine 10, it is possible to move on the next turning by the boring bar 2. After the change of the boring bars 2, the magazine 10 is moved and retracted from the boring bar changing position P2 to the retracted position P3.

The present invention may be applied to a lathe for turning a workpiece by a boring bar, a turning center or the like, in addition to the multi-axis turning center.

As described above, the embodiments of the present invention have been explained. However, it is apparent that the present invention is not limited to the specific embodiment but various kinds of modification and addition within the scope of the spirit of the invention are made possible.

Incidentally, the same reference numerals in the drawings are used to indicate the same or similar components or members.

What is claimed is:

1. A machine tool having a boring bar magazine, comprising:
   a base of the machine tool;
   a main spindle having an axis directed substantially in a horizontal direction to a floor surface, said main spindle being provided with a chuck at a tip end;
   a headstock, positioned on one side out of right and left directions of the machine tool and provided on said base, for rotatably supporting said main spindle;
   a tool rest, provided on said base, being capable of supporting at least the boring bar and being movable in at least two directions of a first direction in parallel to the axis of said main spindle and a second direction perpendicular to the first direction; and
   a boring bar magazine, positioned on the other side out of the right and left directions of the machine tool and provided on said base, which stocks a single or a plurality of boring bars and performs swiveling and indexing operations,
   wherein the boring bar of said tool rest is moved in the at least two directions relative to the workpiece gripped by the chuck to thereby turn the workpiece, and
   said tool rest is moved to change the boring bars between said tool rest and said magazine at an index position,
   wherein a tool holder of the boring bar is mounted on a boring bar mounting portion provided on said tool rest and is clamped and unclamped by a clamping and unclamping mechanism, and said clamping and unclamping mechanism comprises:
   holder side tapered surfaces and holder side plain end faces continuous with the holder side tapered surfaces which are formed on said tool holder and extend, respectively, in a direction in parallel with a centerline of said tool holder;
   tool rest side tapered surfaces and tool rest side plain end faces continuous with the tool rest side tapered surfaces which are formed on said boring bar mounting portion of said tool rest and extend, respectively, in a direction in parallel with a centerline of said tool rest; and
   cylinder portions which are provided in said boring bar mounting portion and are controlled,
   wherein said tool holder is directly depressed by pistons of said cylinder portions whereby said holder side plain end faces and said holder side tapered surfaces are depressed against said tool rest side plain end faces and said tool rest side tapered surfaces, respectively, to thereby clamp said tool holder to said tool rest,
   wherein said tool rest is controlled so that the centerline of said tool rest is directed in a direction in parallel with a centerline of a magazine body portion when the boring bars are changed with each other between said tool rest and said magazine, and
   at this time, the centerline of said magazine body portion, the index position, said boring bar mounting portion, and the centerline of said tool rest are located on the same axis line.

2. The machine tool according to claim 1,
   wherein a boring bar engagement holes into which a boring bar tool is inserted and engaged from one side of the boring bar engagement hole by any desired first insertion depth dimensions, is formed through said tool holder in a longitudinal direction,
   the boring bar tool inserted into said boring bar engagement hole is positioned and fixed by fastening members provided on one side of said tool holder,
   a lid member for having, in its interior, a cutting fluid feed pathway and for covering said boring bar engagement hole is mounted on the other side of said tool holder,
   a projecting member in which a nozzle engagement hole is formed in communication with said cutting fluid feed pathway is mounted on said lid member, and
   a nozzle inserted into and engaged with said nozzle engagement hole by any desired second insertion depth dimension is mounted on an end portion of said boring bar tool,
   whereby cutting fluid runs from said cutting fluid feed pathway of said lid member through said nozzle engagement hole of said projecting member, said nozzle and an inside flow path of said boring bar tool, in this order, and ejects from said boring bar.

3. The machine tool according to claim 2,
   wherein the boring bar is adapted to change at least one dimension out of the first insertion depth dimension of the boring bar tool inserted into the boring bar engagement hole, the second insertion depth dimension of the nozzle inserted into the nozzle engagement hole and the length dimension of the projecting member, respectively, whereby it is possible to adjust the length dimension of the boring bar tool extending outwardly from the tool holder while keeping the flow path through which the cutting fluid runs.

4. The machine tool according to claim 1, wherein said magazine is adapted to move in the first direction between a boring bar changing position and a retracted position.

5. The machine tool according to claim 1, wherein the machine tool is a multi-axis turning center, a rotating tool other than the boring bar is mounted onto said tool rest, and said tool rest is movable also in a third direction which is perpendicular to the first direction and the second direction, respectively, and swivels about an axis of the third direction.

6. A boring bar magazine of the machine tool according to claim 1, wherein the boring bar magazine is used in the machine tool.

7. The boring bar magazine according to claim 6, wherein said magazine is arranged in a position largely remote from the headstock.

8. The boring bar magazine according to claim 6, wherein the magazine body portion has three receiving portions and one plain surface portion to form a substantially rectangular shape as viewed from side, the boring bars are received in said three receiving portions, respectively, and a cover member receiving portion for receiving a tool rest cover member is fixed to the plain surface portion.

9. The machine tool according to claim 1, wherein the machine tool is a lathe adapted to move said tool rest in at least two directions.

* * * * *